(12) United States Patent
Hamel et al.

(10) Patent No.: US 8,090,865 B2
(45) Date of Patent: Jan. 3, 2012

(54) SYSTEMS AND METHODS FOR SELECTING BUFFERING TIME FOR MEDIA DATA

(75) Inventors: Alain Hamel, North Bend, WA (US); HaiFeng Ping, Issaquah, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 13/041,171

(22) Filed: Mar. 4, 2011

(65) Prior Publication Data

US 2011/0153860 A1 Jun. 23, 2011

Related U.S. Application Data

(62) Division of application No. 10/354,439, filed on Jan. 29, 2003, now Pat. No. 7,925,770.

(51) Int. Cl.
*G06F 15/16* (2006.01)

(52) U.S. Cl. .......................... 709/231; 709/220; 709/224

(58) Field of Classification Search ................... 709/231, 709/232, 224, 220
See application file for complete search history.

(56) References Cited

U.S. PATENT DOCUMENTS

| | | | |
|---|---|---|---|
| 5,751,719 A | 5/1998 | Chen et al. | |
| 5,802,106 A | 9/1998 | Packer | |
| 5,822,524 A | 10/1998 | Chen et al. | |
| 5,822,537 A | 10/1998 | Katseff et al. | |
| 5,848,266 A | 12/1998 | Scheurich | |
| 5,887,110 A | 3/1999 | Sakamoto et al. | |
| 5,943,343 A | 8/1999 | Hatta et al. | |
| 6,182,125 B1 | 1/2001 | Borella et al. | |
| 6,222,856 B1 | 4/2001 | Krishnan et al. | |
| 6,259,733 B1 | 7/2001 | Kaye et al. | |
| 6,351,474 B1 | 2/2002 | Robinett et al. | |
| 6,373,855 B1 | 4/2002 | Downing et al. | |
| 6,671,454 B1 | 12/2003 | Kaneko et al. | |
| 6,847,656 B1 | 1/2005 | Wu et al. | |
| 7,151,749 B2 | 12/2006 | Vega-Garcia et al. | |
| 7,274,661 B2 | 9/2007 | Harrell et al. | |
| 7,366,199 B1 | 4/2008 | Vaughan et al. | |
| 7,925,770 B1 | 4/2011 | Hamel et al. | |
| 2002/0143973 A1* | 10/2002 | Price | 709/231 |
| 2003/0135631 A1* | 7/2003 | Li et al. | 709/231 |
| 2004/0103189 A1* | 5/2004 | Cherkasova et al. | 709/224 |
| 2004/0128396 A1* | 7/2004 | Patrick et al. | 709/231 |

OTHER PUBLICATIONS

Office Action mailed Mar. 16, 2010 in U.S. Patent No. 7,925,770, filed Jan. 29, 2003.
Office Action mailed Oct. 6, 2010 in U.S. Patent No. 7,925,770, filed Jan. 29, 2003.

(Continued)

*Primary Examiner* — Philip B Tran
(74) *Attorney, Agent, or Firm* — Kory D. Christensen; Stoel Rives LLP

(57) ABSTRACT

The invention is related to methods and apparatus for tailoring an amount of Pre-Data that can be used in media clip streaming applications. A variable-bit-rate encoded media clip can be encoded at an average playback bit rate. When the actual transmission bit rate exceeds the average playback bit rate, a maximum bit deficit computation that uses the average playback bit rate overestimates the amount of Pre-Data that can be used to buffer the media clip. Embodiments of the invention tailor the amount of Pre-Data at least in part to the amount of data used to encode intervals of data and to actual transmission bit rates or to predictions of actual transmission bit rates, thereby decreasing the amount of Pre-Data that can be used and decreasing a latency time before play of the media clip begins.

12 Claims, 15 Drawing Sheets

OTHER PUBLICATIONS

Notice of Allowance mailed Feb. 18, 2011 in U.S. Patent No. 7,925,770, filed Jan. 29, 2003.

Office Action mailed Sep. 15, 2011 in U.S. Appl. No. 13/043,363, filed Mar. 8, 2011.

* cited by examiner

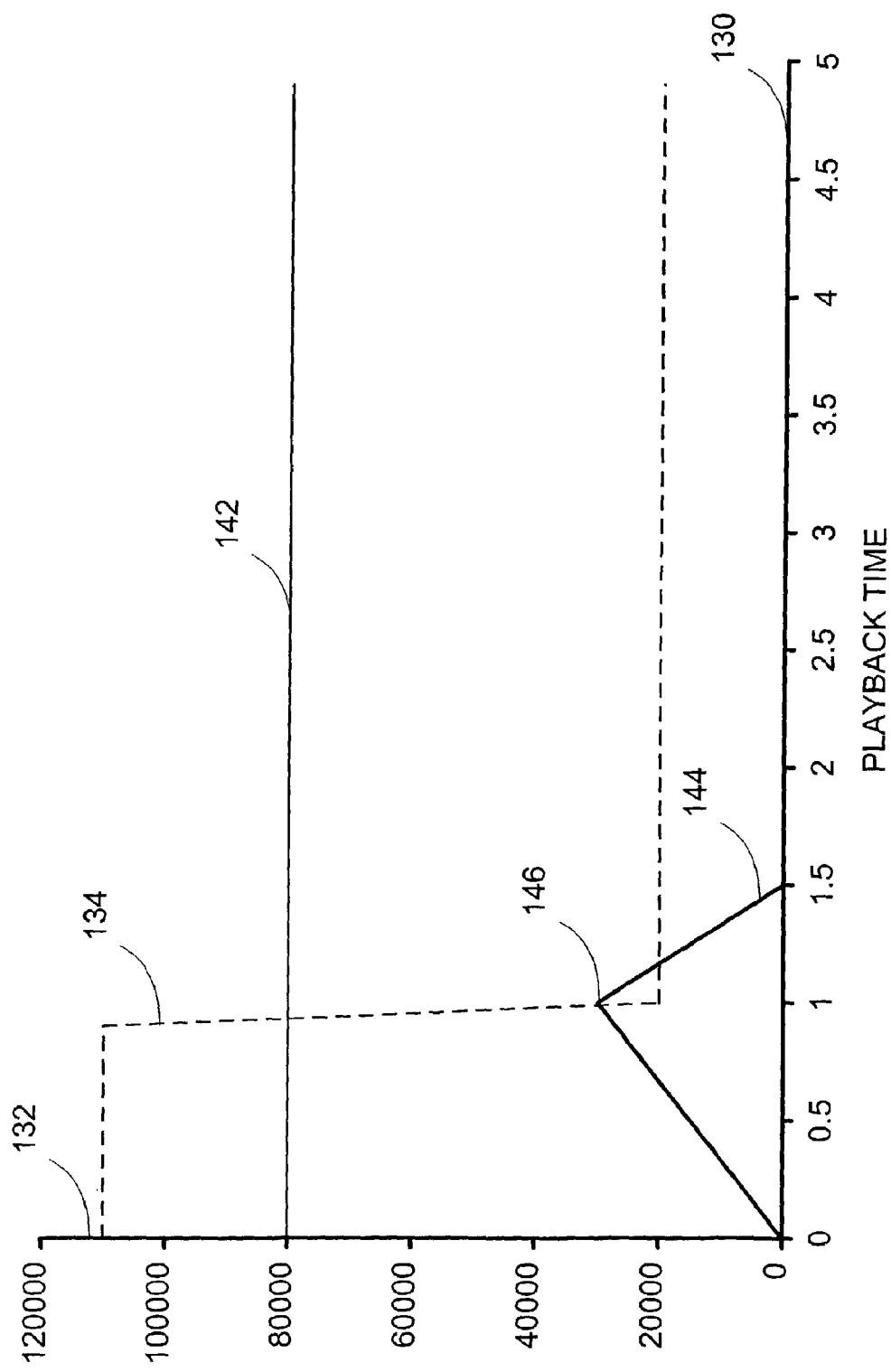

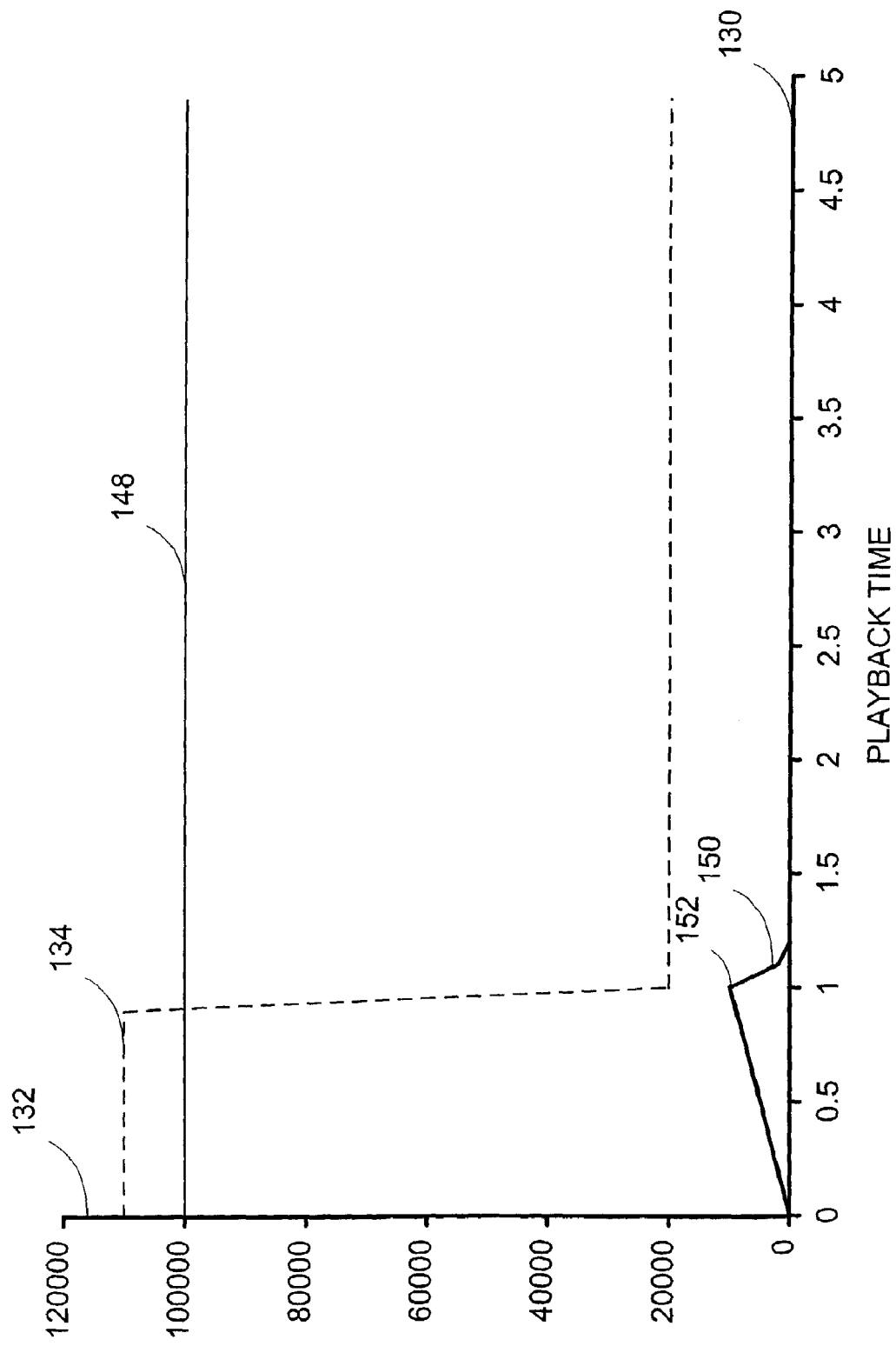

SYSTEMS AND METHODS FOR SELECTING BUFFERING TIME FOR MEDIA DATA

BACKGROUND OF THE INVENTION

1. Field of the Invention

The invention generally relates to computer software, and in particular, to software for media players and encoders.

2. Description of the Related Art

Consumers enjoy listening to and watching various forms of media clips including audio works and video works. Such media clips include, for example, music, videos, movies, home videos, etc. These media clips can be used for a variety of purposes, such as to inform, to educate, or to entertain. Media clips can be played or displayed using a computer, such as a personal computer. Media clips can be retrieved from a variety of sources, including remote sources over a computer network. In addition, media clips can be "streamed" across a computer network.

Streaming techniques are data transfer techniques that permit a media data, such as a media clip, to be used relatively soon after the media clip is selected. With streaming, the selected data can be used, e.g., displayed or played, before all of the data for the media clip is received or even generated. This makes it practical for a media player to, for example, display a newscast or to play back a commentary of a sporting event in a live or nearly live manner. Streaming techniques also shorten the amount of time between selection of a media clip and the displaying or playing of the media clip.

Despite the advantages of streaming, there remains a relatively lengthy delay between the time when playback of a media clip is selected and the time when playback of the media clip actually begins.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 1B illustrates calculation of a bit deficit using a transmission bit rate.

FIG. 1C illustrates calculation of a bit deficit using a transmission bit rate.

DETAILED DESCRIPTION OF PREFERRED EMBODIMENTS

Figure 1A:
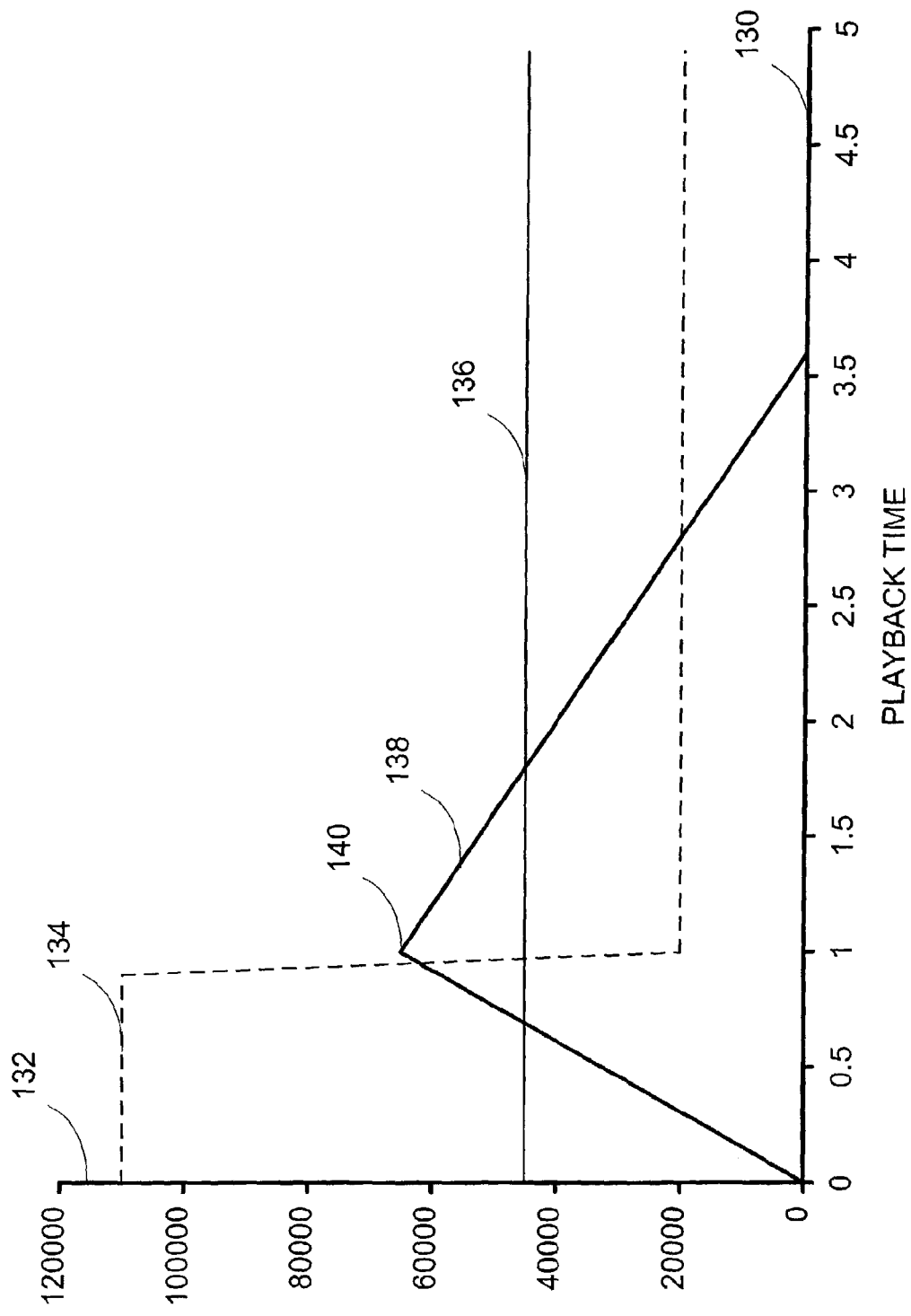
FIG. 1A illustrates calculation of a bit deficit using an average playback bit rate.

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

A media clip can be encoded with a variable bit rate. The variable bit rate permits the amount of data used to encode the media clip to be allocated according to the content of the media clip. For example, in the context of an encoded video clip, more bits can be allocated to encode video frames with rapidly changing motion or for scene changes and fewer bits can be allocated to encode series of video frames that are relatively static. For example, in an MPEG-encoded video clip, frames corresponding to scene changes can be encoded with intra-frames (I-frames), which is typically encoded with a relatively large number of bits. An I-frame can be decoded without information from other frames. By contrast, a frame that is similar to a previous frame can be encoded with a predictive-frame (P-frame), which is typically encoded with a relatively small number of bits. Decoding of a P-frame uses the results of one or more other frames.

When playback of a video clip is initiated, the renderer or codec can start decoding at an I-frame, since the I-frame can be decoded by itself. It will be understood that when a different portion of a video clip is selected, such as in response to fast-forward, skip, rewind, etc., the decoding by the renderer or the code can again start at an I-frame. It will also be understood that a new portion of a video clip may or may not correspond to an I-frame.

When the playback bit rate exceeds the rate at which a media clip is sent, i.e., when data is consumed faster than it is provided, a bit deficit occurs, and a media player retrieves data from a buffer. Data can be stored in the buffer prior to initiation of playback to at least partially fill the buffer. For uninterrupted playback, the buffer should store at least as much as the maximum bit deficit that is expected to occur. The buffer can be filled with more data, of course, but it takes time to store additional data in the buffer. This amount of time, i.e., the time between selection of a media clip and playback of the media clip, can be referred to as a "latency time." During this latency time, the buffer at least partially fills with data. It will be understood that the buffer can also accumulate data during playback when the transmission rate for the data is faster than the playback bit rate. Relatively long latency times can be frustrating to the user who typically desires to see or hear a media clip in a relatively short time after the media clip is selected. Therefore, it is desirable to initiate playback of a media clip with relatively little data in the buffer such that the latency time is relatively short. The effect of playback bit rates and transmission rates on bit deficit are described in connection with FIGS. 1A-1C and with Tables I, II, and III.

FIGS. 1A-1C illustrate computations of bit deficits using various bit rates. In FIGS. 1A-1C, a horizontal axis 130 indicates playback time. A vertical axis 132 indicates both bit rates in kilobits per second (kbs) and an amount of data in kilobits (kb). The vertical axis 132 relates to bit rates in connection with encoded bit rates and for transmission bit rates, and the vertical axis 132 relates to an amount of data in connection with bit deficits.

FIG. 1A illustrates calculation of a bit deficit using an average playback bit rate of about 45 kbs. A dashed line corresponds to a playback bit rate 134 for an encoded media clip. It will be understood by one of ordinary skill in the art that an actual playback bit rate for a media clip can vary in a wide range, and that the playback bit rate 134 used in FIGS. 1A to 1C corresponds to a relatively simple pattern for clarity. The media clip can correspond to, for example, a video clip, or can correspond to a music clip. In the illustrated playback bit rate 134, the playback bit rate 134 is relatively high at about 110 kbs for the first second, and then transitions to a relatively low rate of about 20 kbs.

A flat line corresponds to an average playback bit rate 136 for the media clip. Although the average playback bit rate will typical correspond approximately to the total number of bits used to encode the media clip divided by the total playback time, it will also be understood by one of ordinary skill in the art that the average playback bit rate 136 can be selected as a parameter provided to an encoder prior to encoding the media clip. In conventional systems, the encoder typically assumes that the encoded media clip is provided to the media player with a transmission rate that is the same as the average playback bit rate 136. Accordingly, a conventional encoder uses the average playback bit rate 136 to computes a bit deficit 138, which is shown as a bold waveform. When the playback bit rate 134 exceeds the average playback bit rate 136, the bit deficit 138 grows as indicated by the positive slope. When the average playback bit rate 136 exceeds the playback bit rate 134, the bit deficit 138 shrinks as indicated by the negative slope.

In the example illustrated in FIG. 1A, the average playback bit rate 136 corresponds approximately to 45 kbs. A peak value of the bit deficit 138 corresponds to a maximum bit deficit (MBD) 140 and in the example illustrated in FIG. 1A, the MBD 140 corresponds approximately to 65 kilobits (kb). Latency times associated with this MBD 140 will be described later in connection with Tables I, II, and III.

FIG. 1B illustrates calculation of a bit deficit using a transmission bit rate of about 80 kbs. The dashed line again corresponds to the playback bit rate 134 for the encoded media clip. For the purposes of comparison, the illustrated playback bit rate 134 used has the same pattern in FIGS. 1A-1C. A flat line corresponds to a transmission bit rate 142 of about 80 kbs for the media clip.

A bold waveform corresponds to a bit deficit 144 computed from the playback bit rate 134 and the transmission bit rate 142. When the playback bit rate 134 exceeds the transmission bit rate 142, the bit deficit 144 grows as indicated by the positive slope. When the transmission bit rate 142 exceeds the playback bit rate 134, the bit deficit 144 shrinks as indicated by the negative slope.

A peak value of the bit deficit 144 corresponds to a maximum bit deficit (MBD) 146 and in the example illustrated in FIG. 1B, the MBD 146 corresponds approximately to 30 kilobits (kb). Latency times associated with this MBD 146 will be described later in connection with Tables I, II, and III.

FIG. 1C illustrates calculation of a bit deficit using a transmission bit rate of about 100 kbs. The dashed line again corresponds to the playback bit rate 134 for the encoded media clip. A flat line corresponds to a transmission bit rate 148 of about 100 kbs for the media clip.

A bold waveform corresponds to a bit deficit 150 computed from the playback bit rate 134 and the transmission bit rate 148. When the playback bit rate 134 exceeds the transmission bit rate 148, the bit deficit 150 grows as indicated by the positive slope. When the transmission bit rate 148 exceeds the playback bit rate 134, the bit deficit 150 shrinks as indicated by the negative slope.

A peak value of the bit deficit 150 corresponds to a maximum bit deficit (MBD) 152 and in the example illustrated in FIG. 1B, the MBD 152 corresponds approximately to 10 kilobits (kb). Latency times associated with this MBD 152 will be described later in connection with Tables I, II, and III.

Table I summarizes the MBD computations for transmission bit rates of 45 kbs, 80 kbs, and 100 kbs, as illustrated in FIGS. 1A, 1B, and 1C, respectively. The value for MBD can be added to a value for Minimum Block (MB). When a media player has received a first amount of data to satisfy the MBD and has received a second amount of data to satisfy the MB, the media player can be ready to initiate playback of the media clip. Minimum Block can correspond to a minimum amount of data that is used by a decoder to decode a media clip. The value for Minimum Block can vary from codec to codec. For the purposes of illustration, the examples will be described with the value for Minimum Block set to zero (0). It will be understood that in actual implementations, an appropriate value for the Minimum Block can be added to the computed MBD to generate a value for Pre-Data. Pre-Data can be represented in terms of data, such as bits or bytes, or in terms of time, such as milliseconds. In one embodiment, Pre-Data corresponds to an amount of compressed data.

TABLE I

| Average Playback Bit Rate | Transmission Bit Rate | Maximum Bit Deficit (MBD) | Minimum Block (MB) | Pre-Data |
|---|---|---|---|---|
| 45 kbs | 45 kbs | 65 kb | 0 | 65 kb |
| 45 kbs | 80 kbs | 30 kb | 0 | 30 kb |
| 45 kbs | 100 kbs | 10 kb | 0 | 10 kb |

As illustrated in Table I, an amount of Pre-Data computed for the transmission bit rates of 45 kbs, 80 kbs, and 100 kbs of FIGS. 1A-1C corresponds to 65 kb, 30 kb, and 10 kb, respectively. This amount of Pre-Data, which advantageously varies in response to varying transmission rates, can be stored in a buffer before playback of the media clip is initiated. The larger the amount specified for Pre-Data, the longer it takes before the buffer fills with the specified amount of Pre-Data. The time it takes for the buffer to fill with the specified amount of Pre-Data is approximately the size of the Pre-Data (numerator) divided by the transmission rate (denominator).

Table II illustrates the latency time for varying transmission rates as encountered in conventional systems. In a conventional system, an encoder assumes that the transmission rate is the same as the average playback bit rate and accordingly calculates the MBD as described earlier in connection with FIG. 1A. Table II illustrates the latency times associated with using the values for Pre-Data that derive from MBD computations based on average playback bit rates.

TABLE II

| Conventional Method | | |
|---|---|---|
| Transmission Rate | Pre-Data | Latency Time |
| 45 kbs | 65 kb | 1.44 seconds |
| 80 kbs | 65 kb | 0.812 seconds |
| 100 kbs | 65 kb | 0.650 seconds |

As illustrated in Table II, the amount of Pre-Data (numerator) used in one conventional system is disadvantageously fixed regardless of the transmission rate (denominator). In another conventional system, the Pre-Data is predetermined in terms of time, and provides an even worse comparison. It will be observed that even in conventional systems, the latency times decrease with increasing transmission rates, as the denominator in the latency time calculation increases.

Table III illustrates the effect of advantageously computing MBD and Pre-Data based on transmission rates. As described earlier in connection with FIGS. 1A-1C, the amount of data buffered, and hence the size of the Pre-Data (numerator) used, can advantageously be decreased with transmission bit rates that are higher than the average playback bit rate.

TABLE III

| New Method | | |
|---|---|---|
| Transmission Rate | Pre-Data | Latency Time |
| 45 kbs | 65 kb | 1.44 seconds |
| 80 kbs | 30 kb | 0.375 seconds |
| 100 kbs | 10 kb | 0.100 seconds |

As illustrated in Table III, the amount of Pre-Data computed varies according to the transmission rate. The combination of lowering the size of the Pre-Data and a higher transmission rate results in dramatically reduced latency times. This advantageously permits the latency time to dramatically decrease, thereby enhancing the experience of the user watching or listening to the media clip. Various embodiments of the invention are described in further detail below.

Figure 1D:
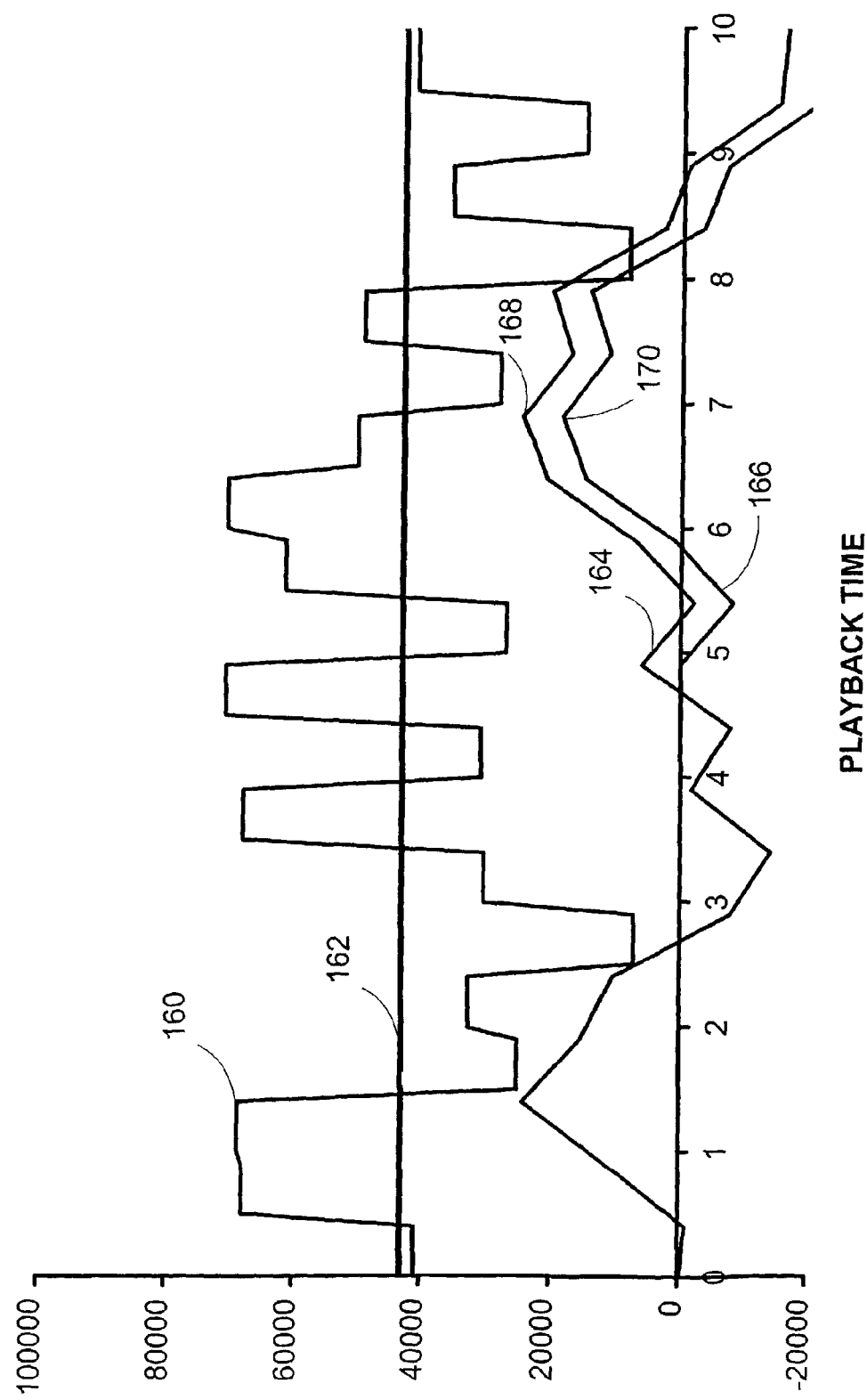
FIG. 1D illustrates how a calculation of bit deficit and of maximum bit deficit can vary depending on the interval over which the hit deficit is calculated.

FIG. 1D illustrates how a calculation of bit deficit and of maximum bit deficit can vary depending on the interval over which the bit deficit is calculated. Playback time is indicated along the horizontal axis. A vertical axis indicates bit rates in bits per second (bps) for the bit rate waveforms, and the vertical axis indicates bit deficit amounts for the bit deficit waveforms.

The bit deficit can vary for a media clip depending on the interval over which it is calculated. As a result, the maximum bit deficit, i.e., the maximum value for the bit deficit over the interval, can also vary, and a single media clip can have multiple maximum bit deficit values. For example, the interval over which the bit deficit is calculated can correspond to the entire media clip, from start to end. However, a user can skip, fast forward, rewind, etc., within a media clip, and the interval over which the bit deficit is calculated should be computed from the portion of the media clip corresponding to the onset of playback, i.e., the portion to which the media clip was skipped, and the last portion of the media clip is selected for playback. In one embodiment, the last portion of the media clip that is selected for playback corresponds to the end of the media clip. However, the last portion of the media clip that is selected can also be other than the end of the media clip. For example, playback of the media clip can be terminated prior to the end of the media clip by selecting playback from a selected start time to a selected end time. The waveforms drawn in the example of FIG. 1D illustrate sample bit deficit calculations for playback that is initiated at time zero and for playback that is initiated about 5 seconds after time zero such that the intervals over which bit deficit values are calculated corresponds to 0 to 10 seconds and 5 to 10 seconds, respectively.

A first waveform corresponds to a playback bit rate 160 for an encoded media clip. The playback bit rate 160 illustrated in FIG. 1D corresponds to a variable bit rate such that the bit rate of the playback bit rate 160 varies over time. A flat line corresponds to an average playback bit rate 162 for the media clip. In FIG. 1D, the average playback bit rate 162 corresponds to approximately 43,000 bits per second.

A second waveform corresponds to first bit deficit 164. The first bit deficit 164 illustrated in FIG. 1D is calculated over a first interval that starts at time zero, i.e., zero seconds. A third waveform corresponds to a second bit deficit 166. The second bit deficit 166 is calculated over a second interval that starts about 5 seconds after the first interval, i.e., at about five seconds. For clarity, the intervals in FIG. 1D end at the ten-second mark.

A maximum value for the bit deficits corresponds to the maximum bit deficit value. For example, a peak value for the first bit deficit 164 corresponds to a maximum bit deficit value 168 for the first interval. A peak value for the second bit deficit 166 corresponds to a maximum bit deficit value 170 for the second interval.

Figure 1E:
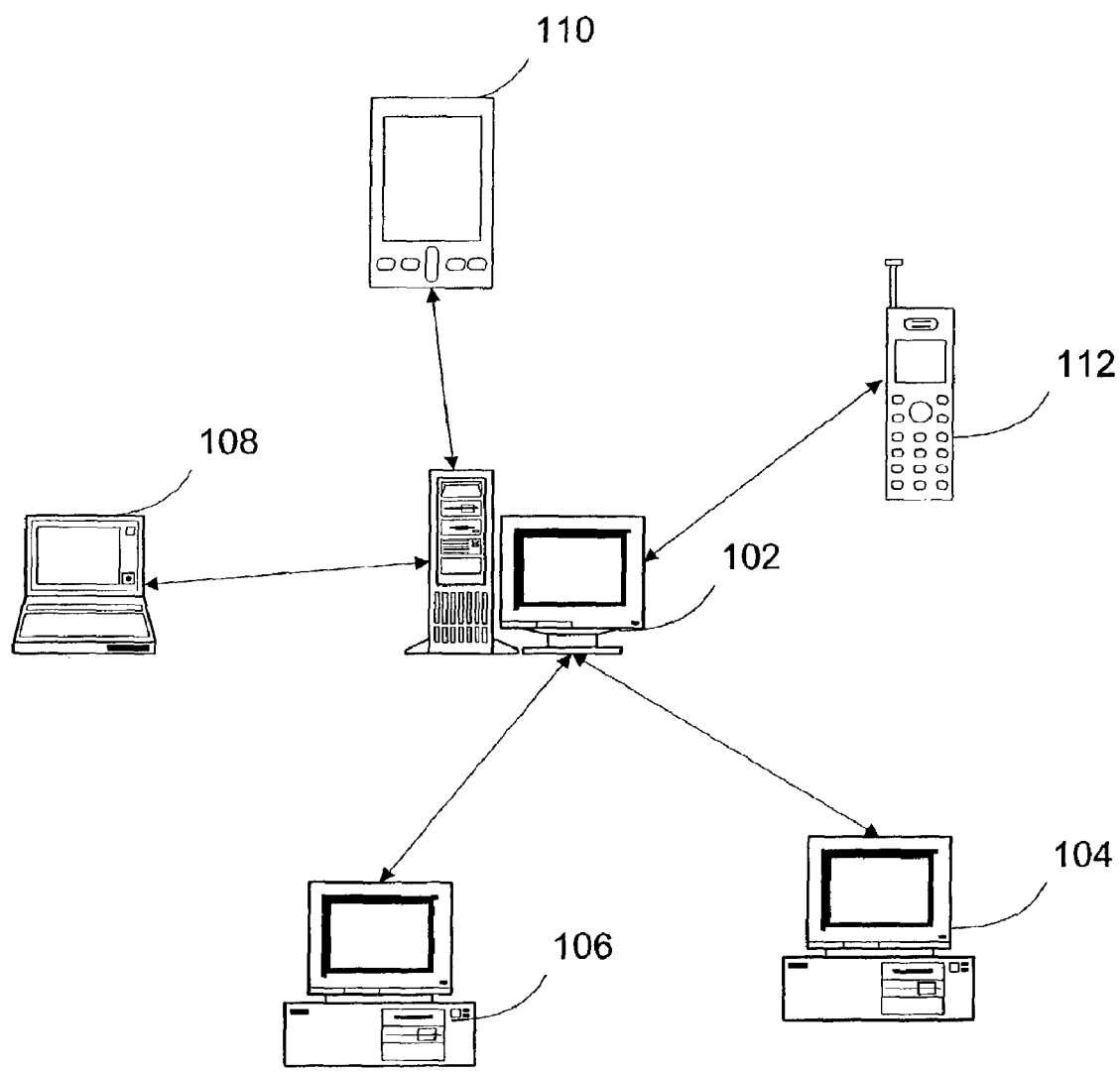
FIG. 1E illustrates an embodiment of a networked system including a media clip streaming system.

Networked System:

FIG. 1E illustrates an embodiment of a networked system including a media clip streaming system. A network of computers includes at least two computer systems that are linked together. A media clip includes at least a portion of an audio work or a video work, which typically has been recorded or stored, but can also be live. A media clip and the corresponding Pre-Data can also correspond to other data types, such as a database file that can be streamed. The illustrated media clip streaming system includes a server 102, which can be coupled with one or more user computers or nodes. A node corresponds to a processing location in a network. A node can correspond to, for example, a computer system. A node can also correspond to a dedicated media player.

Server:

The server 102 can correspond to a Web site. It will be understood that the term "site" does not imply a single geographic location, as a Web site or other network site can include one or more geographically distributed computer systems that can be appropriately linked together. For example, the server 102 can correspond to multiple computer systems in geographically remote locations, as well as to a single computer in one location. One embodiment of the server 102 corresponds to a Helix™ Universal Server or to a Real System® Server from RealNetworks, Inc of Seattle, Wash.

The servers may be uniprocessor or multiprocessor machines. Additionally, these servers can include a memory device, such as an addressable storage medium or computer accessible medium, including dynamic random access memory (DRAM), static random access memory (SRAM), an electronically erasable programmable read-only memory (EEPROM), flash memory, hard disks, redundant arrays of inexpensive disks (RAID), floppy disks, laser disk players, digital video devices, Compact Disc ROMS, DVD-ROMS, video tapes, audio tapes, magnetic recording tracks, electronic networks, and other techniques to transmit or store electronic content such as, by way of example, programs and data. The computers may execute an appropriate operating system such as Linux, Unix®, Microsoft® Windows® 3.1, Microsoft® Windows® 9x, Microsoft® Windows® NT, Microsoft® Windows® 2000, Microsoft® Windows® Me, Microsoft® Windows® XP, Apple® MacOS®, IBM® OS/2®, Solaris™ operating environment software, and the like. The operating system can include a communications protocol implementation, which handles incoming and outgoing message traffic passed over the network. In other embodiments, while the operating system may differ depending on the type of computer, the operating system may continue to provide the appropriate communications protocols necessary to establish communication links with the network.

The servers typically include program logic, or some other substrate configuration representing data and instructions, which causes a computer to operate in a specific and predefined manner as described herein. In one embodiment, the program logic can be implemented as one or more modules. The modules can be configured to reside on the addressable storage medium and configured to execute on one or more processors. A module can include part of a software program that may be combined or used together with other modules of the software program. A module can include data, can contain an executable function, or both. A module does not have to be located in the same file as another module with which it is combined. For example, a module can be located in a dynamic linked library (DLL). The modules may include, but may not be limited to, software or hardware components, which perform certain tasks. Thus, a module may include, by way of example, components, such as, software components, object-oriented software components, class components and task components, processes, methods, functions, attributes, procedures, subroutines, segments of program code, drivers, firmware, microcode, circuitry, data, databases, data structures, tables, arrays, and variables.

User computers or media players can be coupled with the server through a computer network to receive a stream of a media clip. It will be understood that a media player can correspond to a general-purpose personal computer that executes media player software to play or display media clips. Streaming advantageously permits data to be used, e.g., displayed or played, before all of the data is received. Streamed data can include data as the data is being transmitted or downloaded. The streamed data can, for example, include data packets. As illustrated in FIG. 1E the server 102 couples with a first user computer 104, a second user computer 106, a third user computer 108, a fourth user computer 110 illustrated as a portable digital assistant (PDA), and a fifth user computer 112 illustrated as a Web-enabled cell phone. Of course, the number of servers and the number of computers or media players in the networked system can vary in a very broad range and can change over time as computers connect and disconnect from networks. A user computer from the multiple user computers can be any microprocessor or processor controlled device, including, but not limited to, a terminal device, such as a personal computer, a workstation, a server, a client, a mini computer, a main-frame computer, a laptop computer, a network of individual computers, a mobile computer, a palm top computer, a hand held computer, a set-top box for a TV, an interactive television, an interactive kiosk, a personal digital assistant, an interactive wireless communications device, a wireless Web-enabled cell phone, and the like.

Figure 2:
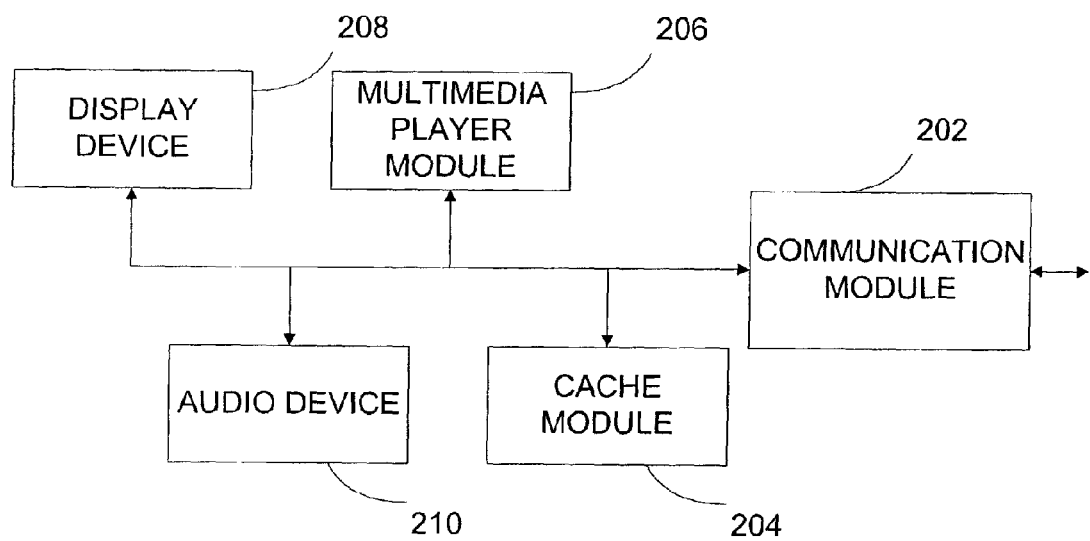
FIG. 2 illustrates a high-level block diagram of an embodiment of a user computer.

User Computer:

FIG. 2 illustrates one embodiment of a user computer that can be used with the networked system as a media player. The user computer includes a communication module 202 that may advantageously be adapted to permit the user computer to communicate with other computers, such as with the server 102. Communication between a user computer and the server 102 can be established with a connectionless-oriented protocol, a connection-oriented protocol, or both. Examples of connectionless protocols include User Datagram Protocol (UDP) and Internet Packet Exchange (IPX). Connectionless protocols advantageously permit greater throughput than connection-oriented protocols for the streaming of media clips. Examples of connection-oriented protocols include HTTP, Transmission Control Protocol/Internet Protocol (TCP/IP), and RealTime Streaming Protocol (RTSP).

For example, a user computer can be coupled with the server 102 via a direct connection or via a network. The network can include a wide area network (WAN) such as the Internet, a local area network (LAN) such as an Ethernet, or both. The user computers can be equipped with communication devices such as a network interface card, a T-1 modem, a digital subscriber line (DSL) modem, a cable modem, an integrated services digital network (ISDN) modem, a dial-up modem, a wireless network, and any other device suitable for communication over a network. The WAN can include wireless networks, such as G3 or code division multiple access (CDMA). The LAN can include wireless communications such as bluetooth. It will be recognized that a network that carries a streamed media clip can also carry other types of information, such as data for a word processing application.

A cache module 204 temporarily stores data received in a stream by the communication module 202 so that the data may advantageously be available for access by a multimedia player module 206. The multimedia player module 206 configures the streamed media clip such that the streamed media clip can be played back on a display device 208 and/or an audio device 210.

These user computers described may be uniprocessor or multiprocessor machines. Additionally, these computers can include an addressable storage medium or computer accessible medium, such as dynamic random access memory (DRAM), static random access memory (SRAM), an electronically erasable programmable read-only memory (EEPROM), flash memory, hard disks, floppy disks, laser disk players, digital video devices, Compact Disc ROMS, DVD-ROMS, video tapes, audio tapes, magnetic recording tracks, electronic networks, and other techniques to transmit or store electronic content such as, by way of example, programs and data. The computers may execute an appropriate operating system such as Linux, Unix®, Microsoft® Windows® 3.1, Microsoft® Windows® 9x, Microsoft® Windows® NT, Microsoft® Windows® 2000, Microsoft® Windows® Me, Microsoft® Windows® XP, Apple® MacOS®, IBM® OS/2®, Microsoft® Windows® CE, Palm OS®, Solaris™ operating environment software, and the like. The operating system can include a communications protocol implementation, which handles incoming and outgoing message traffic passed over the network. In other embodiments, while the operating system may differ depending on the type of computer, the operating system may continue to provide the appropriate communications protocols necessary to establish communication links with the network.

The computers typically include program logic, or some other substrate configuration representing data and instructions, which causes a computer to operate in a specific and predefined manner as described herein. In one embodiment, the program logic can be implemented as one or more modules. The modules can be configured to reside on the addressable storage medium and configured to execute on one or more processors. A module can include part of a software program that may be combined or used together with other modules of the software program. A module can include data, can contain an executable function, or both. A module does not have to be located in the same file as another module with which it is combined. For example, a module can be located in a dynamic linked library (DLL). The modules may include, but may not be limited to, software or hardware components, which perform certain tasks. Thus, a module may include, by way of example, components, such as, software components, object-oriented software components, class components and task components, processes, methods, functions, attributes, procedures, subroutines, segments of program code, drivers, firmware, microcode, circuitry, data, databases, data structures, tables, arrays, and variables.

The depicted components can communicate with each other and other components comprising the respective computers through mechanisms such as, by way of example, interprocess communication, remote procedure call, and other various program interfaces. Furthermore, the functionality provided for in the components, modules, and databases may be combined into fewer components, modules, or databases or further separated into additional components, modules, or databases. Additionally, the components, modules, and databases can be implemented to execute on one or more computers.

A user computer may further possess input devices such as a keyboard, a mouse, a trackball, a touch pad, or a touch screen and output devices such as a computer screen, printer, speaker, or other input/output devices now in existence or later developed. It will be understood that a user or a person can own, operate, or control more than one user computer, and that a single user computer can be used by more than one user.

A user computer can access the server 102 via a browser, such as Netscape Navigator® it developed by Netscape Communications Corporation of Mountain View, Calif., Microsoft® Internet Explorer developed by Microsoft Corporation of Redmond, Wash. These browsers can have media play capability via plug-in modules or can be integrated with a media player. An example of an integrated browser and media player is the RealOne™ player from RealNetworks, Inc of Seattle, Wash. A customized interface can also be used to permit the server 102 and a user computer to communicate.

A user computer can be configured to communicate with the server 102 in a variety of ways. In one embodiment, a user computer communicates with the server 102 in a network with a client/server architecture such that a user computer is a client. A client can correspond to any computer system, which a user can use to run an application, such as a media player. A client can receive resources, such as a streamed media clip, from the server 102. In one embodiment, when a user computer communicates with the server 102 to transmit and/or receive controls such as the selection of a media clip, the user computer uses standard connection-oriented protocols such as Hyper Text Transfer Protocol (HTTP) and Transmission Control Protocol/Internet Protocol (TCP/IP).

Figure 3:
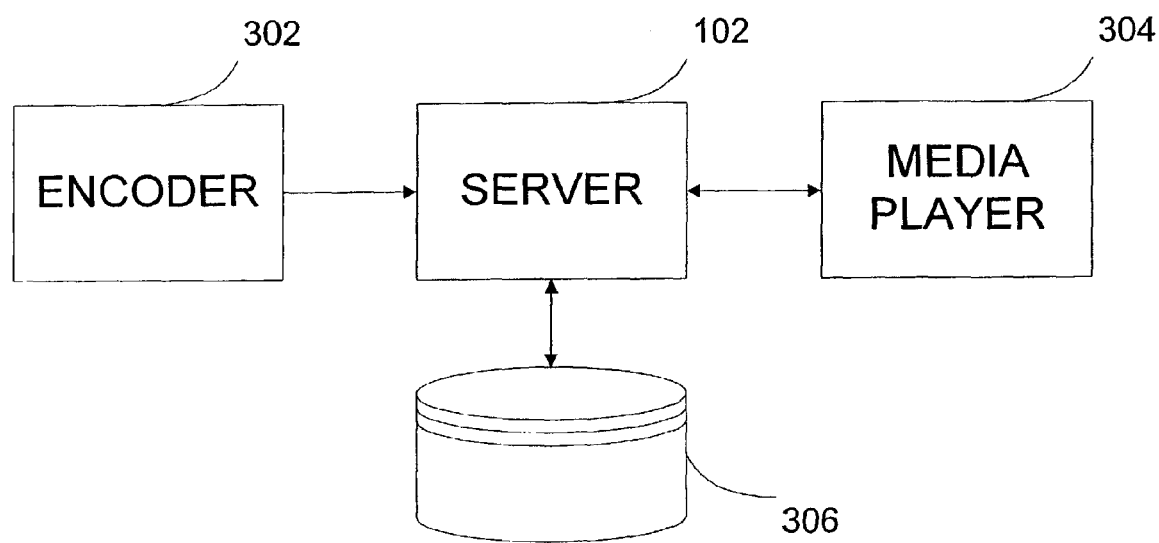
FIG. 3 illustrates components of a media streaming system.

Media Streaming System:

FIG. 3 illustrates components of a media streaming system. The media streaming system includes an encoder 302, the server 102, and a media player 304. The encoder 302 can be embodied in either software or in hardware, and can encode media clips in real time or in non-real time. The encoder 302 can be configured to encode media clips in a variety of formats. Examples of encoding formats for video include RealVideo® format; Moving Pictures Experts Group (MPEG) format; Advanced Streaming Format (ASF); Audio Video Interleave (AVI) format; QuickTime (MOV) format; and others formats now in existence or later developed. Examples of formats for audio clips include RealAudio® format from RealNetworks, Inc; MPEG, audio layer 3 (MP3) format; Windows Media audio (WMA) format; Advanced Audio Coding (AAC) format; WAV format; and other formats now in existence or later developed. One embodiment of the encoder 302 is described in greater detail later in connection with FIG. 4.

The server 102 can be coupled to the encoder 302 to receive the encoded media clip. The server 102 can be configured to store the media clip, to send the media clip out in a "live" or nearly "live" manner, or both as applicable. In one embodiment, the server 102 advantageously reduces overhead by storing encoded media clips in a data store 306 in the same packets that are used to send the media clips to the media player 304. One example of a data packet is described in greater detail later in connection with FIG. 7. The media player 304 can be a software program embodied in a tangible medium, such as a hard disk, a CD-ROM, or solid-state memory. The media player 304 can also be embodied in dedicated hardware as described earlier in connection with the user computers of FIG. 1E.

Encoder:

A media player typically buffers an amount of data, known as "Pre-Data," of a streamed media clip before the media player begins to play the media clip or the selected portion of the media clip. The Pre-Data can be represented in terms of data, such as bits or bytes, or in terms of time, such as milliseconds. Media players also typically buffer data when a selected portion of the media clip is changed, e.g., when a media clip is fast-forwarded, when a chapter is skipped, etc. This delay, known as a "latency time," can be relatively long with slow network transmission rates as encountered with dial-up modems, but can be frustratingly long even with relatively high network transmission rates, including those of broadband networks. Embodiments of the invention can advantageously reduce the amount of Pre-Data, by tailoring the amount of Pre-Data that can be used in a streaming session.

Figure 4:
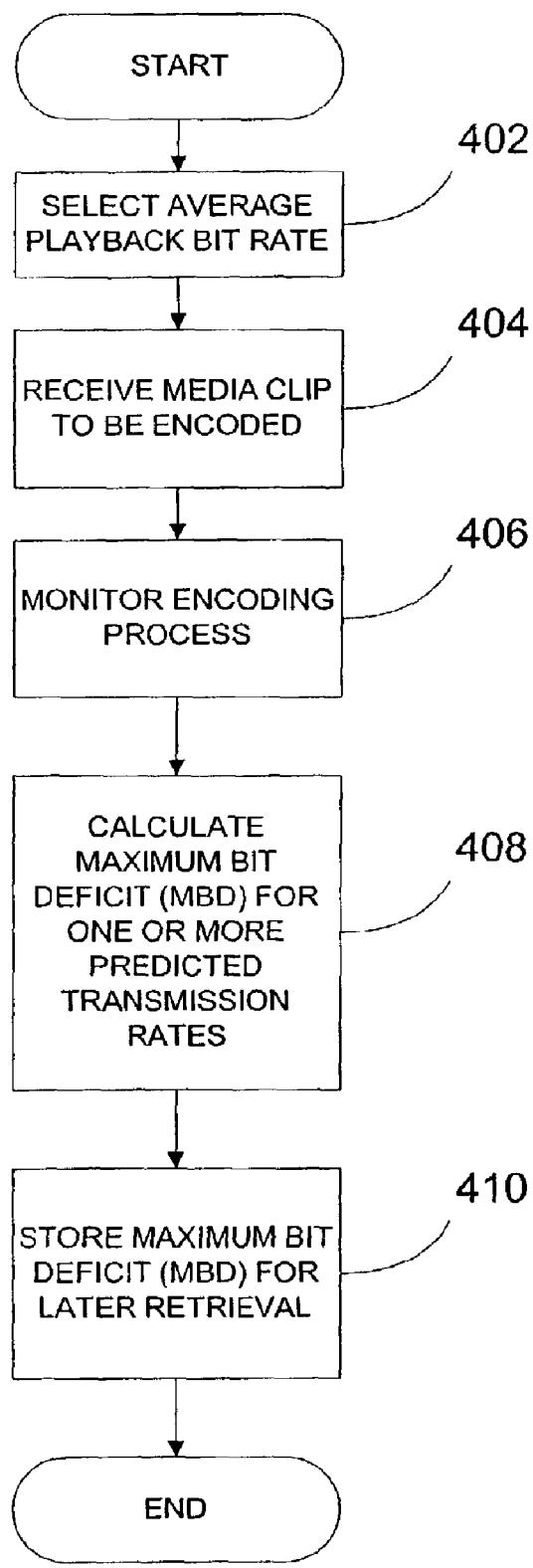
FIG. 4 is a flowchart that generally illustrates a process for estimating one or more maximum bit deficit (MBD) values while encoding.

FIG. 4 generally illustrates a process for estimating one or more maximum bit deficit (MBD) values while encoding a media clip. The estimated maximum bit deficit (MBD) values can advantageously be used during play of the media clip to reduce latency time. The process can compute a maximum bit deficit (MBD) value that is tailored to a particular streaming session and can be significantly lower than the maximum bit deficit (MBD) value calculated by conventional unsophisticated techniques. The process takes into account predictions of actual available bit rates when encoding a media clip and uses these predictions to calculate maximum bit deficit (MBD) values that can advantageously be more appropriate in actual use than a maximum bit deficit (MBD) value based on average bit rates, i.e., average playback bit rates. It will be understood by the skilled practitioner that the MBD value can be computed based on a transmission rate that is assumed by the encoder, which can include the average playback bit rate with which the encoder encoded the media data. For example, an available bit rate can correspond to a transmission rate that is available between a server and a client. However, it will be understood by the skilled practitioner that in another embodiment, the encoder can select a different value for the transmission rate that is not the same as the average bit rate and the MBD can vary accordingly. As used herein, the term "average bit rates" or "predetermined bit rates" can include an arithmetic mean of the bits for the media data divided by playback time, an median bit rates, and other predetermined statistical values that can depend on the total amount of data and playback time.

An encoded media clip can be stored in the data store 306 and streamed to the media player 304 by the server 102. It will be understood that the encoding of a media clip can be performed at a different time than the streaming of the media clip. Moreover, the media clip can be provided by the server 102 to many different media players, which may communicate with the server 102 at varying rates. For example, the actual bit transmission rate can vary according to the type of communications used, e.g., dial-up modem versus DSL, and according to network congestion. One of ordinary skill in the art will appreciate that when the encoding and the streaming take place at different times, the actual bit transmission rate used to stream the data to the media player will be unknown to the encoder 302.

The process depicted in FIG. 4 predicts actual bit transmission rates used to stream the data and accordingly provides one or more values for the maximum bit deficit (MBD) that can be used by a server or used by the media player to advantageously reduce latency time by selecting a relatively small amount of data to be buffered prior to initiating play than the amount of data buffered that would be specified via conventional techniques.

The process starts at a first state 402, where the process selects an average playback bit rate with which to encode the media clip. The average playback bit rate corresponds to the average rate at which bits are used to encode and/or decode the media clip. A media clip can be encoded with a variable bit rate or with a constant bit rate. Variable bit rates permit the bits to be allocated unevenly within an encoded media clip such that, for example, scenes in a video clip corresponding to rapidly changing motion can be encoded with relatively more bits than scenes with relatively little motion.

Media clips that are encoded with variable bit rates can be encoded with a predetermined average playback bit rate. It will be understood that the same media clip can be encoded one or more times with one or more average playback bit rates such that different bandwidth versions of a media clip can be provided for streaming to users. It will be understood that the average playback bit rates used can be selected in a very broad range and can also be pre-selected from a standard list. For example, average playback bit rates of 20 kilobits per second (kps), 34 kps, 45 kps, 80 kps, 150 kps, 225 kps, 350 kps, and 450 kps can be used for streaming intended via a 28.8 k modem, a 56 k modem, a Single ISDN modem, a Dual ISDN modem, a LAN/T1 (low), a DSL/Cable (low) modem, a DSL/Cable (med) modem, and a DSL/Cable (high) modem, respectively. The skilled practitioner will appreciate that the average bit rates may be less than expected for a particular data transfer technique because some of the actual transmission bandwidth may be occupied by overhead, such as error correction, and by packet headers. The process advances from the first state 402 to a second state 404.

In the second state 404, the process receives the media clip to be encoded. The media clip can be received in real time or retrieved from a data store, provided in a raw form or can be decoded from a compressed source, etc. The process advances from the second state 404 to a third state 406, where the process monitors the bits consumed during encoding of the media clip. The encoder 302 encodes the media clip according to the average playback bit rate selected in the first state 402 and according to the format specified. The encoder 302 can encode the media format in a broad variety of formats, e.g., MPEG, MOV, etc. The process advances from the third state 406 to a fourth state 408.

In the fourth state 408, the process calculates one or more values for the maximum bit deficit (MBD) for one or more predicted or anticipated transmission rates of actual available bit rates. These predicted transmission rates can vary in number and can vary in a broad range. For example, the predicted transmission rates can be selected from a predetermined list. The predicted transmission rates should be higher than the average playback bit rate used to encode the media clip because the process takes advantage of actual available bit rates that are higher than the average playback bit rate used to encode the media clip. In one embodiment, the process calculates maximum bit deficit (MBD) values for about 10 predicted transmission rates. The server 102 can select among these maximum bit deficit (MBD) values during transmission as described later in connection with FIG. 6.

The maximum bit deficit (MBD) value for a particular available bit rate can be calculated over intervals of time. The intervals can be distinct or can overlap to provide running maximum bit deficit (MBD) values. These intervals of time can be fixed or variable. For example, the maximum bit deficit (MBD) value can also be calculated over amounts of data. Preferably, these intervals correspond to an amount of data in a data packet used to transmit the media clip such that each packet can include information about the maximum bit deficit (MBD) for one or more predicted transmission rates. For example, one embodiment of the server 102 transmits data in 32 kB packet payloads, and the process correspondingly computes the maximum bit deficit (MBD) approximately 32 kB at a time. In one embodiment, the intervals for calculations of the maximum bit deficit (MBD) correspond to multiples of the packet payload. In another embodiment, the maximum bit deficit (MBD) is calculated over selected periods of time, such as every millisecond.

The maximum bit deficit (MBD) can be computed by comparing the amount of data actually used by the encoder to encode the media clip over a time interval with the predicted amount of data that the media player is capable of receiving over the time interval. Equation 1 expresses one embodiment of a calculation for maximum bit deficit (MBD), where actual$_{data,T}$ indicates the amount of data actually used over a time interval, PBR indicates the predicted bit rate, and T indicates the time interval.

$$\text{MBD}_{new}(T) = \text{MAX}\{\text{actual}_{data,T} - (\text{PBR} \cdot T)\} \qquad \text{(Eq. 1)}$$

As illustrated in Equation 1, the calculation for maximum bit deficit (MBD) takes the maximum of the difference between the bits actually used and the bits that could be transmitted given the predicted bit rate. It will be understood that T, the time interval, corresponds to a time interval during streaming and not to a time related to the length of time it takes for an encoder to encode a portion of a media clip.

The time interval T, corresponds to the time interval over which the bit deficit is computed. The time interval T can correspond to the duration of the entire media clip, i.e., from the beginning of the media clip to the end of the media clip. However, it will be appreciated that portions of a media clip can be skipped via fast forward commands, rewind commands, skip commands, and the like, such that playback of a media clip can be initiated at virtually any point within the media clip. It will also be appreciated that playback of the media clip can be configured to terminate prior to the end of the media clip, such as, for example, by playback from a selected start time to a selected end time. Thus, it will be appreciated by one of ordinary skill in the art that the time interval T can correspond to nearly any time interval within the media clip.

As described earlier in connection with FIG. 1D, the bit deficit and a value for MBD can vary depending on the time interval T. Accordingly, multiple values for MBD can be calculated for a given predicted bit rate for multiple time intervals T. In one embodiment, the time intervals start at various points within the media clip and end at the end of the media clip, such that the bit deficits and the MBD values are calculated for various points within the media clip to the end of the media clip. For example, the computation of the MBD value can be stored in a data packet, where the time interval T for the MBD computation starts at the time of the data packet, i.e., as though playback were initiated at the start of that data packet, and ends at the end of the media clip.

By contrast, conventional encoders compare the amount of data actually used by the encoder to encode the media clip over the time interval with a theoretical amount of data in an interval of time that would be used if the encoded bitstream were to be transmitted at the average playback bit rate. However, a media player may have access to the media clip at a rate that exceeds the average playback bit rate so that a maximum hit deficit (MBD) computation based on the average playback bit rate is inefficiently overly conservative. This inefficiency leads to a needlessly and frustratingly long latency time. Equation 2 expresses an embodiment of a conventional calculation for maximum bit deficit (MBD) value, where actual$_{data,T}$ again indicates the amount of data actually used over a time interval, ABR indicates the average playback bit rate, and T again indicates the time interval.

$$\text{MBD}_{conventional}(T)=\text{MAX}\{\text{actual}_{data,T}-(\text{ABR} \cdot T)\} \quad \text{(Eq. 2)}$$

The savings in latency time can be more dramatic than might be expected. For example, the actual transmission rates may be high enough that over the applicable interval, no instantaneous deficit occurs. The amount of Pre-Data computed by a conventional media player is typically computed by adding two values: a first value for a minimum block (MB) of data and a second value for the maximum bit deficit (MBD). The first value for the minimum block (MB) is determined by the particular codec/renderer that is used to decode the media clip for the media player. In a conventional system, the second value for the maximum bit deficit (MBD) is calculated by an encoder via the conventional maximum bit deficit (MBD) computation techniques described and is provided in the data stream for the media clip. Equation 3 expresses one computation for Pre-Data, where P indicates the amount of Pre-Data. It will be understood that in another embodiment, Pre-Data can be referenced by time instead of by an amount of data.

$$P=\text{MB}+\text{MBD} \quad \text{(Eq. 3)}$$

In one example, where the amount of Pre-Data calculated via conventional maximum bit deficit (MBD) computation techniques corresponds to 500,000 bits, and the actual transmission rate corresponds to about 120,000 bits per second, the latency time can be a relatively long 5 seconds. When the maximum bit deficit (MBD) used by the media player is computed based on an actual 120,000 bits per second transmission rate, the Pre-Data can be reduced to about 50,000 bits and the latency time can be reduced to about 0.5 seconds. It will be understood by one of ordinary skill in the art that the actual latency times that result will vary depending on the media clip and the number of bits actually used to encode the media clip. The process advances from the fourth state 408 to a fifth state 410.

In the fifth state 410, the process stores the pre-calculated maximum bit deficit (MBD) values for later use or further refinement of a maximum bit deficit (MBD) value as described later in connection with FIG. 6. The pre-calculated maximum bit deficit (MBD) values can be stored in a variety of ways. For example, the pre-calculated maximum bit deficit (MBD) values can be stored in the same file as the encoded file, can be stored in header packets of pre-packetized encoded files, can be stored in records of a database and related to portions of an encoded file, etc. After performing the fifth state 410, the process ends.

Figure 5:
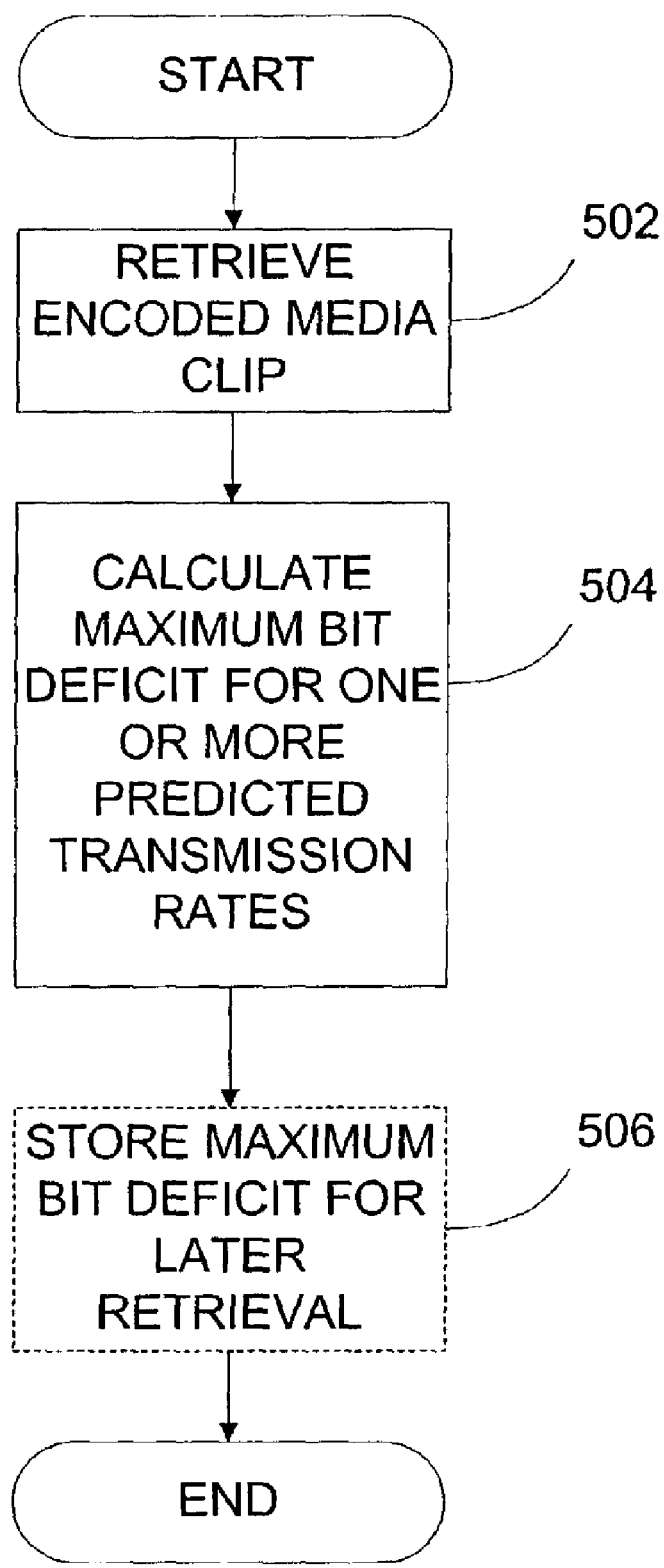
FIG. 5 is a flowchart that generally illustrates a process for calculating one or more maximum bit deficit (MBD) values from an encoded data source.

Server:

FIG. 5 illustrates a process for generating pre-calculated maximum bit deficit (MBD) values from an encoded data source. As described earlier in connection with FIG. 4, an encoded media clip can be decoded and re-encoded for calculation of tentative maximum bit deficit (MBD) values. However, as illustrated by FIG. 5, the pre-calculated maximum bit deficit (MBD) values can also be generated efficiently without re-encoding the media clip.

The process starts at a first state 502, where the process retrieves the encoded media clip from a data store. The process does not have to be performed at the rate specified for play of the media clip. The process advances from the first state 502 to a second state 504.

In the second state 504, the process calculates the maximum bit deficit (MBD) by comparing the actual bits used in a time interval, T, to the bits available to be transmitted according to one or more anticipated transmission rates. The calculation of the maximum bit deficit (MBD) values can be performed by Equation 1, which was described earlier in connection with FIG. 4. The time interval, T, corresponds to time intervals that will be encountered during streaming. In one embodiment, the time interval, T, is variable and the computation of the maximum bit deficit (MBD) is taken over amounts of data, such as packet sizes. One embodiment uses time stamps in the encoded media clip to track the time interval, T.

The process advances from the second state 504 to an optional third state 506. While the process can be computed in real time while streaming a media clip, it is computationally more efficient to pre-calculate values for the maximum bit deficit (MBD) and to reuse the pre-calculated values. The process can store the pre-calculated values in a variety of ways as described earlier in connection with the fifth state 410 in FIG. 4. After performing the optional third state 506, the process ends.

Figure 6:
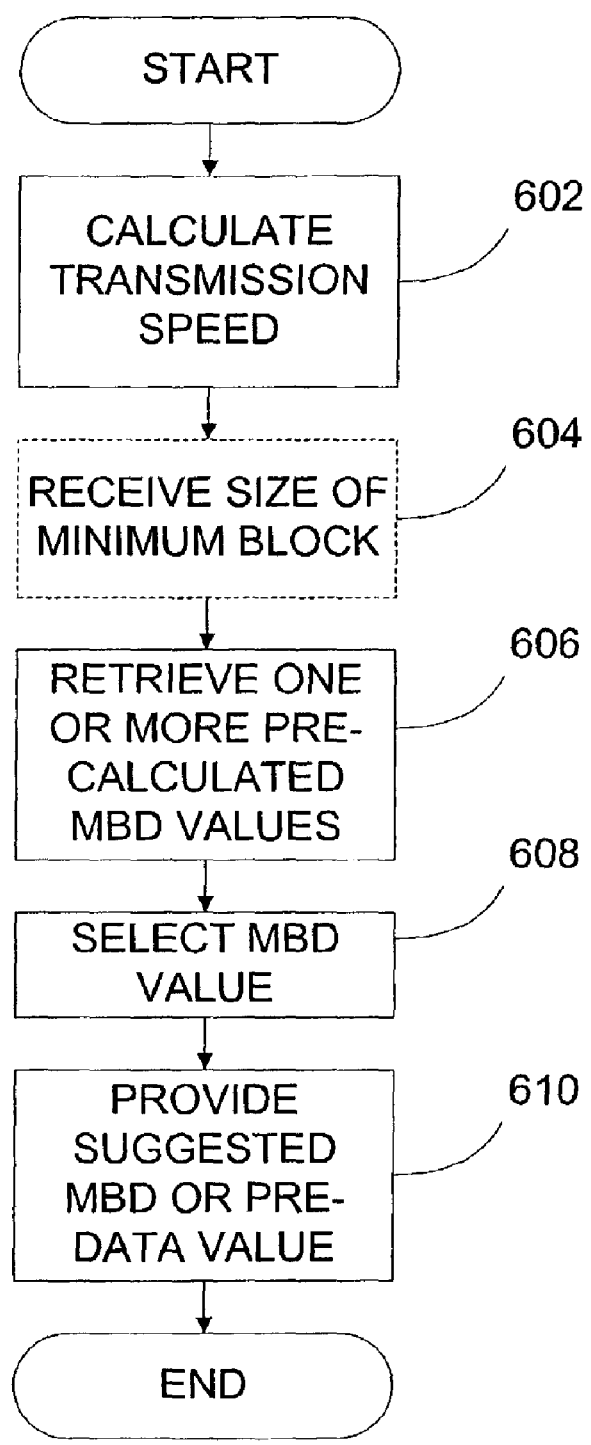
FIG. 6 is a flowchart that generally illustrates a process that can be used by a server to provide a Pre-Data value or a maximum bit deficit (MBD) value to a media player.

FIG. 6 generally illustrates a process that can be used by a server to provide a Pre-Data value or a maximum bit deficit (MBD) value to a media player. The process starts at a first state 602, where the process calculates the actual transmission speed between the server and the media player. It should be noted that this transmission speed should correspond to the actual or real rate for the data transfer from the server to the media player, i.e., should not include bits used for overhead, such as error correction information. In one example, the server sends test messages to the media player to determine the actual transmission speed. The process advances from the first state 602 to an optional second state 604. When the optional second state 604 is not performed, the process advances to a third state 606.

In the optional second state 604, the process receives an indication from the media player as to the minimum block (MB) size used by the codec/renderer of the media player when decoding a media file. It will be understood that the minimum block (MB) value can vary from codec/renderer to codec/renderer and can also vary with the format of the media file. In one embodiment, the process uses the value for the minimum block (MB) size to provide the media player with a value for the Pre-Data, which is summed from the minimum block (MB) and the specified maximum bit deficit (MBD). In another embodiment, the process provides the media player with a value for the maximum bit deficit (MBD), and the media player calculates the Pre-Data. The process advances from the optional second state 604 to the third state 606.

In the third state 606, the process retrieves one or more pre-calculated maximum bit deficit (MBD) values from a data store. These pre-calculated maximum bit deficit (MBD) values correspond to the maximum bit deficit (MBD) values computed based on predicted or anticipated transmission rates. In one embodiment, where the data store maintains the encoded file in pre-formatted data packets, the pre-calculated maximum bit deficit (MBD) values can be stored in and retrieved from the headers of the data packets. In another embodiment, the process calculates the maximum bit deficit (MBD) based on the actual transmission rate. However, it will be understood by one of ordinary skill in the art that a computation of the maximum bit deficit (MBD) based on actual transmission rates for each streaming event can be computationally intensive and can be more efficiently computed during the encoding process. The process advances from the third state 606 to a fourth state 608.

In the fourth state 608, the process selects an appropriate maximum bit deficit (MBD) value based on the actual transmission rate. In one embodiment, the process selects a maximum bit deficit (MBD) value based on a predicted transmission rate that is approximately the same as the actual transmission rate. In another embodiment, the process selects a maximum bit deficit (MBD) value that is based on a predicted transmission rate that is the closest predicted transmission rate lower than the actual transmission rate. In another embodiment, the process estimates a value for the maximum bit deficit (MBD) from two or more pre-calculated maximum bit deficit (MBD) values, i.e., interpolates a value for the maximum bit deficit (MBD). In yet another embodiment, the process provides multiple values for the maximum bit deficit (MBD) computed at varying bit rates, such as, for example, some or all of the values for maximum bit deficit (MBD) calculated at various predicted bit rates such that the media player can select a maximum bit deficit (MBD) value to be used. The process advances from the fourth state 608 to a fifth state 610.

In the fifth state 610, the process provides the selected or calculated maximum bit deficit (MBD) or Pre-Data value to the media player. In addition, when the minimum block (MB) value is known, the process can sum the maximum bit deficit (MBD) and the minimum block (MB) to provide a value for the Pre-Data to the media player. The process then ends. It will be understood that the value for maximum bit deficit (MBD) or the value for Pre-Data that is computed by the process can vary within a media clip so that applicable portions of the process may be repeated when streaming is interrupted by events such as repeat, fast-forward, rewind, and pause commands.

Figure 7:
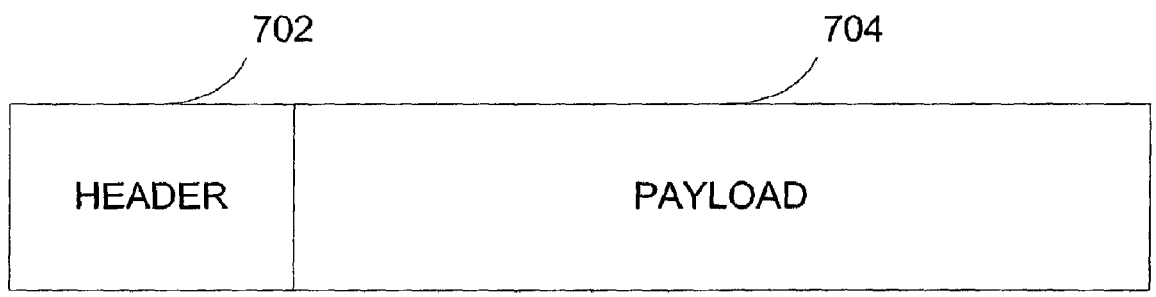
FIG. 7 illustrates a data packet.

Data Packet:

Computer networks typically use a packet switching protocol to send messages such as streamed media files. FIG. 7 illustrates an example of a data packet. The illustrated data packet includes a header 702 and a payload 704. The header 702 can include information such as the destination IP address and the source IP address, as well as error correction information such as a checksum or CRC of the payload 704. The header 702 is part of the "overhead" associated with the transmission of data, and the overhead reduces the actual transmission rate of the data. The payload 704 contains the actual data for the data packet.

In one embodiment, the server stores the media clips to be streamed in packets to reduce the amount of processing performed when streaming media clips. It will be understood by one of ordinary skill in the art that the server will typically modify or add to the header 702 to provide, for example, an appropriate IP address for the destination, i.e., the IP address associated with a media player. In one embodiment, the server sends the media player a value for the maximum bit deficit (MBD) or Pre-Data in the header 702 of a data packet.

Figure 8:
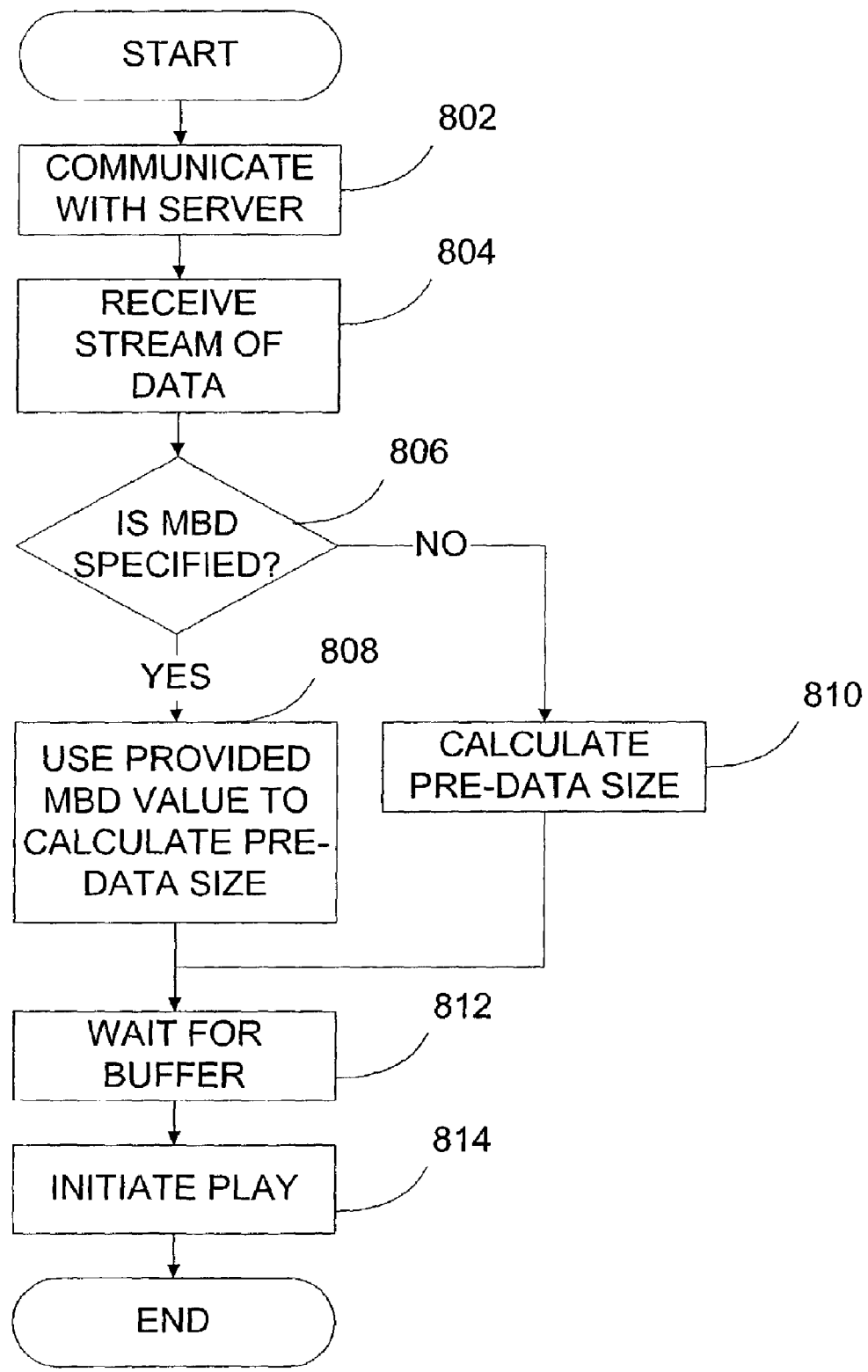
FIG. 8 is a flowchart that generally illustrates a process for selectively using a maximum bit deficit (MBD) value to select a Pre-Data value in a media player.

Media Player:

FIG. 8 generally illustrates a process for using a received maximum bit deficit (MBD) value or Pre-Data value to speed-up the start of play in a media player. The process starts at a first state 802, where the process selects a portion of a media clip. For example, the first state 802 can correspond to the selection of a media clip or to a selection of a new section within an already selected media clip, i.e., fast-forwarding, rewinding, etc. The process provides an indication to the server as to the selected media clip or to the portion of the selected media clip. In one embodiment, the process also provides the server with an indication of a codec/renderer used by the media player or an indication of the minimum block (MB) size of the applicable codec/renderer. The process advances from the first state 802 to a second state 804.

In the second state 804, the process receives a stream of data from the server for the selected media clip. Initially, at least a portion of the received stream of data is loaded to a buffer before play of the media clip commences. The process advances from the second state 804 to a decision block 806.

In the decision block 806, the process determines whether a maximum bit deficit (MBD) value or a Pre-Data value has been provided by the server. The process proceeds from the decision block 806 to a third state 808 when a maximum bit deficit (MBD) value or a Pre-Data value has been provided. Otherwise, the process proceeds from the decision block 806 to a fourth state 810.

In one embodiment, where the speed-up feature can be enabled/disabled by an option or can be provided in a "premium" software package, but not provided in a "basic" software package, the process can proceed from the decision block 806 to the fourth state 810 even if a maximum bit deficit (MBD) value or a Pre-Data value has been provided. In one embodiment, the premium software package and the basic software package can be provided in a common computer program, and the software package enables the premium software package in response to a key received from the server, which can further provide the key in response to a sign-in process. The sign-in process can be completed by provision of a username and a password. Other terms that may be used to describe a sign-in process include "log on," "login," and "log in." In one example, the sign-in process relates to a media content subscription.

In the third state 808, the process uses the provided maximum bit deficit (MBD) value or the provided Pre-Data value to buffer the streamed media clip prior to initiating play. Where only the maximum bit deficit (MBD) value is provided, the process can add the provided maximum bit deficit (MBD) with a value for the minimum block (MB) to generate the value for the Pre-Data. The process advances from the third state 808 to a fifth state 812.

In the fourth state 810, the process computes a value for Pre-Data without using a maximum bit deficit (MBD) value or a Pre-Data value provided by the server that had been calculated based on a transmission rate. In one embodiment, the process calculates the Pre-Data in the fourth state 810 via conventional techniques, such as by summing an average-playback-bit-rate-based maximum bit deficit (MBD) and the minimum block (MB). In another embodiment, the process determines an estimate of the maximum bit deficit (MBD) given an actual transmission rate that exceeds the average playback bit rate as explained in greater detail later in connection with FIG. 10. The process advances from the fourth state 810 to the fifth state 812.

In the fifth state 812, the process waits until the level of data stored in the buffer is at least as large as the amount the Pre-Data value specified in the third state 808 or in the fourth state 810. The process advances from the fifth state 812 to a sixth state 814 when the buffer has reached the Pre-Data value.

In the sixth state 814, the process initiates play of the media clip and ends. Advantageously, when the amount of Pre-Data used is less than the amount of Pre-Data specified by a computation based on the average playback bit rate, the corresponding latency time experienced by a user of the media player is shortened.

Figure 9:
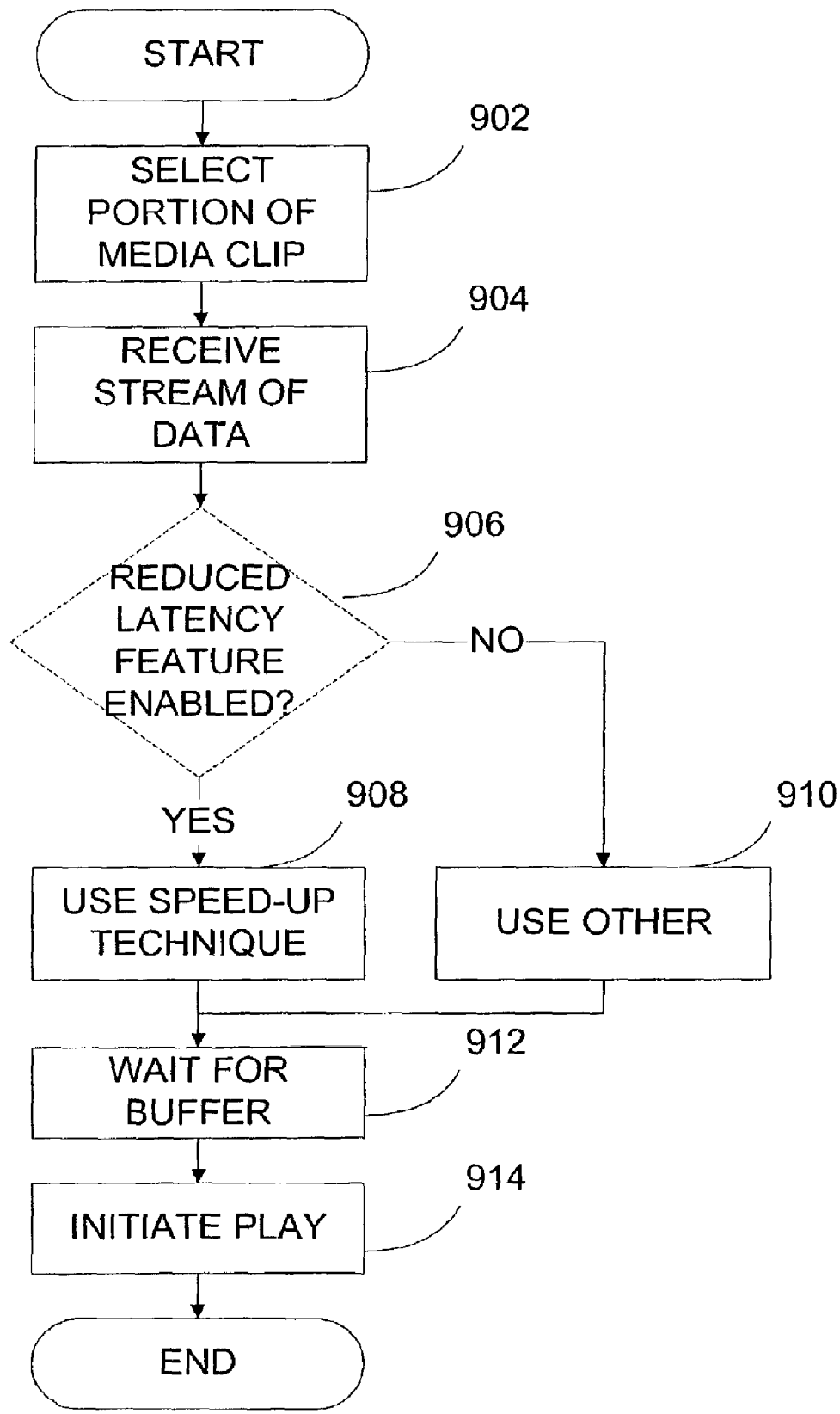
FIG. 9 is a flowchart that generally illustrates another process for selectively using a Pre-Data value in a media player.

FIG. 9 generally illustrates another process for selectively using a Pre-Data value in a media player. The process can advantageously be used by a media player that does not use a conventionally calculated Pre-Data value or maximum bit deficit (MBD) value. For example, the process of FIG. 9 can be used by a media player receiving a conventional stream of data, i.e., receiving a streaming media clip without receiving a Pre-Data value or a maximum bit deficit (MBD) value tailored to the actual transmission bit rate.

The process starts at a first state 902, where the process selects a portion of a media clip. As described earlier in connection with the first state 802 of FIG. 8, the selection can correspond to the selection of a media clip or to a selection of a new section within an already selected media clip. The process advances from the first state 902 to a second state 904.

In the second state 904, the process receives a stream of data from the server for the selected media clip. Initially, at least a portion of the received stream of data is loaded to a buffer before play of the media clip commences. The process advances from the second state 904 to an optional decision block 906. When the process does not perform the optional decision block 906, the process advances from the second state 904 to a third state 908.

In the optional decision block 906, the process determines whether to perform the reduced latency time process. In one embodiment, the feature can be enabled or disabled by user preference. In another embodiment, the feature can be enabled or disabled in response to a sign-in process. The process proceeds from the optional decision block 906 to the third state 908 in response to enabling of the reduced latency time feature. Otherwise, the process proceeds from the optional decision block 906 to a fourth state 910.

In the third state 908, the process uses the actual transmission rate to decrease the amount of Pre-Data calculated for the buffer. The Pre-Data calculated in the third state 908 can be related to the actual transmission rate for the media clip. For example, a relationship between the size of the Pre-Data versus an actual transmission rate or ratio of the actual transmission rate to the average playback bit rate can be retrieved from a lookup table or from a formula that expresses the relationship, which can be based on experimentally determined results. In one embodiment, the encoded average playback bit rate of the clip can be retrieved from the file header sent by the server. One example of a Pre-Data calculation based on a ratio of an actual transmission rate to an average playback bit rate is described in greater detail later in connection with FIG. 10. The process advances from the third state 908 to a fifth state 912.

In the fourth state 910, the process uses a different technique, such as a conventional technique, to compute the amount of Pre-Data to be buffered. The process advances from the fourth state 910 to the fifth state 912.

In the fifth state 912, the process waits until the amount of data stored in the buffer is at least as large as the amount of Pre-Data specified by the third state 908 or by the fourth state 910. The process advances from the fifth state 912 to a sixth state 914 when the amount of data in the buffer has reached the Pre-Data value.

In the sixth state 914, the process initiates play of the media clip and ends. When the amount of Pre-Data used is less than the amount of Pre-Data specified by a computation based on the average playback bit rate, the corresponding latency time experienced by a user of the media player can advantageously be shortened.

Figure 10:
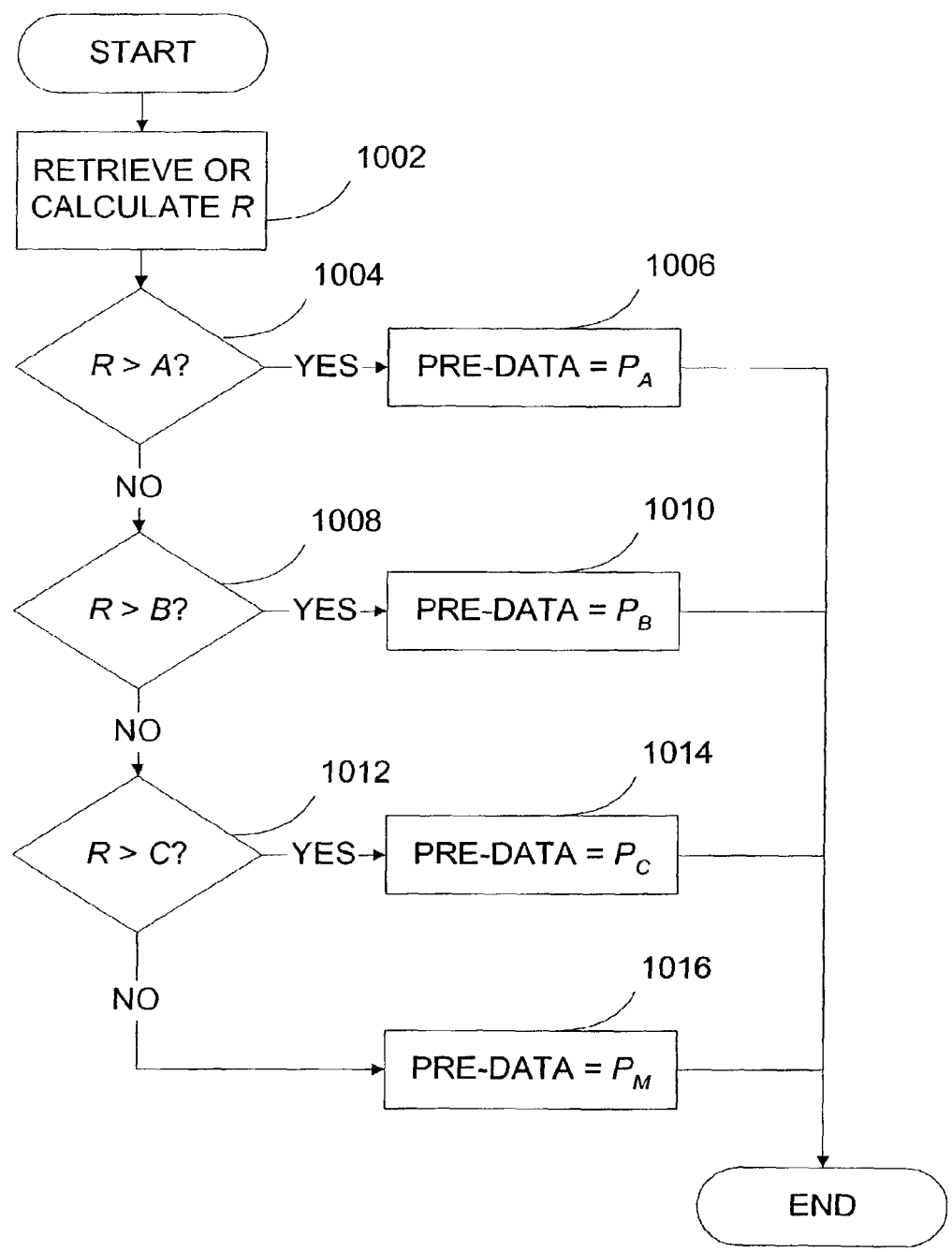
FIG. 10 is a flowchart that generally illustrates a process for selecting a Pre-Data value in a media player.

FIG. 10 generally illustrates a process for selecting a Pre-Data value in a media player. Advantageously, the process can tailor a Pre-Data value in response to a comparison between an actual transmission rate and an average playback bit rate and thereby can advantageously reduce latency time. The process illustrated in FIG. 10 can advantageously tailor the Pre-Data value without receiving tailored values for Pre-Data or maximum bit deficit (MBD) from the server. It will be understood that the process generally illustrated in FIG. 10 can be subject to many variations. The process starts at a first state 1002. In the first state, the process retrieves or calculates a value for R, a ratio of the actual available bit rate AAR to the average playback bit rate ABR, as expressed in Equation 4.

$$R = \frac{AAR}{ABR} \qquad \text{(Eq. 4)}$$

The value for R can be calculated by the server and provided to the media player or can be calculated by the media player. The process advances from the first state 1002 to a first decision block 1004. In the process illustrated by FIG. 10, the process selects one of four Pre-Data values depending on the value for R. It will be understood that in another embodiment, the process can select from fewer Pre-Data values, such as 2 or 3, or select from more Pre-Data values, such as 5 or more.

In the first decision block 1004, the process compares the value for R to a first predetermined ratio value A. The process proceeds from the first decision block 1004 to a second state 1006 when the value for R exceeds the value of the first predetermined ratio value A. Otherwise, the process proceeds from the first decision block 1004 to a second decision block 1008. It will be understood that relationships between amounts can be expressed in a variety of ways, such as greater than, greater than or equal, etc.

The predetermined values can be determined experimentally. Table IV illustrates sample values that can be used for the predetermined values. It will be understood that the predetermined values can vary in a broad range and that the values presented in Table IV only illustrate examples of values that can be used. It will be understood that other values and other ranges may be appropriate and can be readily determined by one of ordinary skill in the art. For example, the first predetermined ratio value A can correspond to a value of about 3.9 such that when the actual transmission rate is at least 3.9 times higher than the average playback bit rate of the media clip, the process proceeds from the first decision block 1004 to the second state 1006. Otherwise, the process proceeds from the first decision block 1004 to the second decision block 1008.

In the second state 1006, the process selects a first predetermined Pre-Data value $P_A$, and the process ends. Advantageously, the first predetermined Pre-Data value $P_A$ can be significantly less than a Pre-Data value calculated via conventional techniques, i.e., a sum of a minimum block (MB) size and an average playback bit rate-based maximum bit deficit (MBD), such that the latency time for a media player using the process illustrated in FIG. 10 can be relatively lower than the latency time for a media player using Pre-Data calculated via conventional techniques. Table IV illustrates sample values for the first predetermined Pre-Data value $P_A$ that can be used for video clips and audio clips. For example, where the media clip corresponds to a video clip, the first predetermined Pre-Data value $P_A$ can correspond to 4 video frames worth of data. For example, where the media clip corresponds to an audio clip, the first predetermined Pre-Data value $P_A$ can correspond to 1000 mS worth of audio data.

In the second decision block 1008, the process compares the value for R to a second predetermined ratio value B. The process proceeds from the second decision block 1008 to a third state 1010 when the value for R exceeds the value of the second predetermined ratio value B. Otherwise, the process proceeds from the second decision block 1008 to a third decision block 1012. With reference to Table IV, which illustrates sample predetermined values, the second predetermined ratio value B can correspond to a value of about 2.5 such that when the actual transmission rate is between about 2.5 times and 3.9 times higher than the average playback bit rate of the media clip, the process proceeds from the second decision block 1008 to the third state 1010. Otherwise, the process proceeds from the second decision block 1008 to the third decision block 1012.

In the third state 1010, the process selects a second predetermined Pre-Data value $P_B$, and the process ends. Advantageously, the second predetermined Pre-Data value $P_B$ can be less than a Pre-Data calculated via conventional techniques, i.e., a sum of a minimum block (MB) size and an average playback bit rate-based maximum bit deficit (MBD), such that the latency time for a media player using the process illustrated in FIG. 10 can be relatively lower than the latency time for a media player using Pre-Data calculated via conventional techniques. Table IV illustrates sample values for the second predetermined Pre-Data value $P_B$ that can be used for video clips and audio clips. For example, where the media clip corresponds to a video clip, the second predetermined Pre-Data value $P_B$ can correspond to 8 video frames worth of data. For example, where the media clip corresponds to an audio clip, the second predetermined Pre-Data value $P_B$ can correspond to 1176 mS worth of audio data.

In the third decision block 1012, the process compares the value for R to a third predetermined ratio value C. The process proceeds from the third decision block 1012 to a fourth state 1014 when the value for R exceeds the value of the third predetermined ratio value C. Otherwise, the process proceeds from the third decision block 1012 to a fifth state 1016. With reference to Table TV, which illustrates sample predetermined values, the third predetermined ratio value C can correspond to a value of about 1.5 such that when the actual transmission rate is between about 1.5 times and 2.5 times higher than the average playback bit rate of the media clip, the process proceeds from the third decision block 1012 to the fourth state 1014. Otherwise, the process proceeds from the third decision block 1012 to the fifth state 1016.

In the fourth state 1014, the process selects a third predetermined Pre-Data value $P_C$, and the process ends. Advantageously, the third predetermined Pre-Data value $P_C$ can be less than a Pre-Data calculated via conventional techniques, i.e., a sum of a minimum block (MB) size and an average playback bit rate-based maximum bit deficit (MBD), such that the latency time for a media player using the process illustrated in FIG. 10 can still be lower than the latency time for a media player using Pre-Data calculated via conventional techniques. Table IV illustrates sample values for the third predetermined Pre-Data value $P_C$ that can be used for video clips and audio clips. For example, where the media clip corresponds to a video clip, the third predetermined Pre-Data value $P_C$ can correspond to 12 video frames worth of data. For example, where the media clip corresponds to an audio clip, the third predetermined Pre-Data value $P_C$ can correspond to 1250 mS worth of audio data.

In the fifth state 1016, where the actual transmission rate is less than 1.5 times greater than the average playback bit rate, the process uses conventional techniques to calculate the amount of Pre-Data, and the process ends. For example, the process can use a value that is the sum of the minimum block (MB) size and an average playback bit rate-based maximum bit deficit (MBD).

TABLE IV

| Ratio | Video | Audio |
|---|---|---|
| above 3.9 (A) | $P_A$ = 4 frames | $P_A$ = 1000 ms |
| between 2.5 (B) and 3.9 (A) | $P_B$ = 8 frames | $P_B$ = 1176 ms |
| between 1.5 (C) and 2.5 (B) | $P_C$ = 12 frames | $P_C$ = 1250 ms |
| below 1.5 (C) | use conventional | use conventional |

Figure 11:
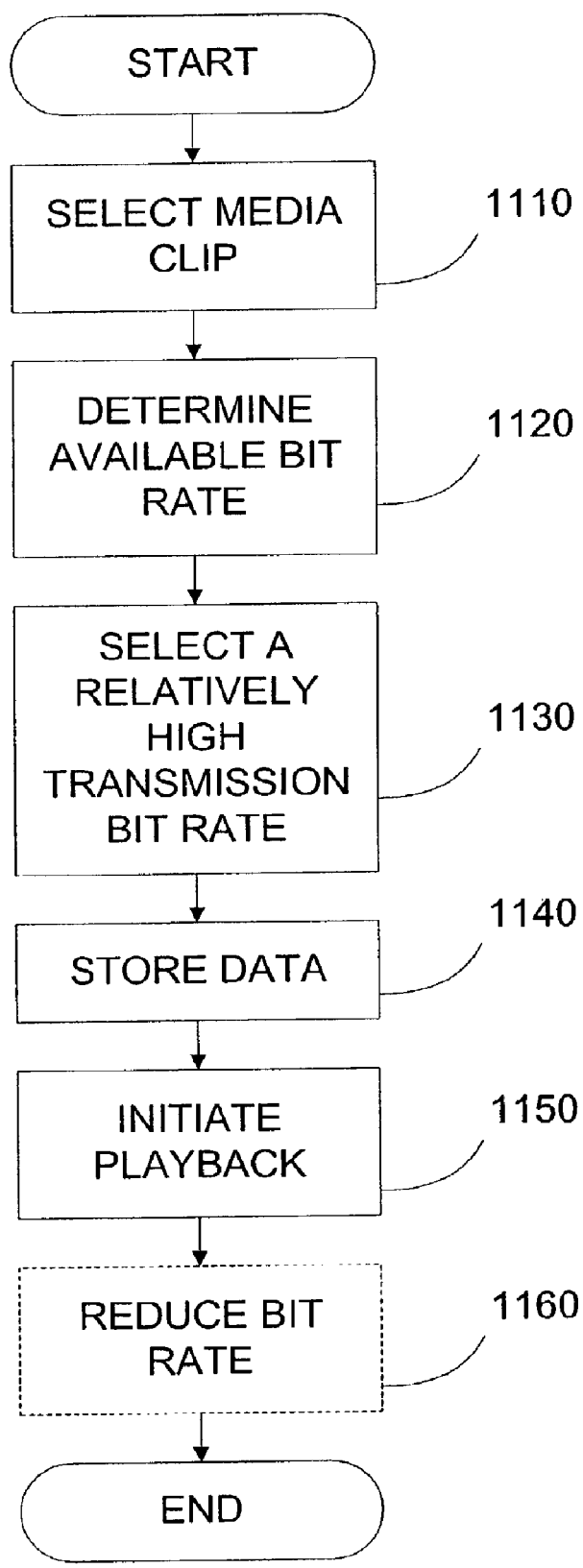
FIG. 11 is a flowchart that generally illustrates a process for selecting a transmission bit rate for a streamed data.

FIG. 11 generally illustrates a process for selecting a transmission bit rate for streamed data, such as a media clip. Although the illustrated process is described in the context of a media clip, one of ordinary skill in the art will appreciate that the process can also apply to other data types, such as to a database file. In one embodiment, the process illustrated in FIG. 11 is implemented by a media player. The process starts at a first state 1110, where a media clip is selected for playback. The selected media clip can be characterized by an average playback bit rate. In the first state 1110, a media player can interact with a user to receive a selection of a media clip. It will be understood that due to seek commands, e.g., seek, fast forward, rewind, etc., that first state 1110 can also correspond to a selection of a new portion within a media clip that has already been selected. The process advances to a second state 1120.

In the second state 1120, the process determines the available bit rate for data transmission between the source of the media clip and the media player, e.g., between the server and the client. For example, the available bit rate can be determined by the server or by the media player. The process advances to a third state 1130.

In the third state 1130, the process selects a relatively high available bit rate for streaming of the media clip from the server to the media player. Preferably, the relatively high available bit rate selected for streaming is higher than the average playback bit rate of the media clip. In one embodiment, the selected transmission bit rate corresponds to the highest available bit rate between the server and the media player. The transmission bit rate can be selected by the server or by the media player. In one embodiment, the transmission bit rate is selected by the media player, the media player requests the selected transmission bit rate from the server, and the server begins to provide the media clip at the selected transmission bit rate. The process advances to a fourth state 1140.

In the fourth state 1140, the process stores data for the media clip that is provided by the server. The process stores data, i.e., Pre-Data, prior to initiating playback of the media clip. Advantageously, the transmission bit rate that is at least initially selected for streaming of the media clip permits the amount of Pre-Data to be dramatically reduced. When the predetermined amount of data or the predetermined length of time corresponding to the Pre-Data has transpired, the process advances to a fifth state 1150.

In the fifth state 1150, the process initiates playback of the media clip. In one embodiment, the combination of reducing the amount of Pre-Data and at least initially streaming the data at a relatively high transmission hit rate permits latency to be dramatically reduced, thereby advantageously enhancing the viewing experience of the media clip. The process can optionally advance to a sixth state 1160.

In the optional sixth state 1160, the process reduces the transmission bit rate used to stream the media clip from the server to the media player. Without a reduction in the transmission bit rate, the streaming of the media clip at a relatively high transmission rate can disadvantageously increase the loading on the server that streams the media clip and consume excessive network bandwidth. For example, the transmission bit rate can be reduced to approximately the average playback bit rate of the media clip to advantageously reduce the load on the server and reduce the amount of network bandwidth consumed. In one embodiment, the process reduces the transmission bit rate after a predetermined time has passed after playback has been initiated or after a predetermined amount of additional data for the media clip has been buffered. For example, the media player can communicate with the server to reduce the transmission bit rate. The process then ends.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

We claim:

1. A method of configuring a media player, the method comprising:
receiving and buffering an amount of streamed media data;
retrieving a value for a maximum bit deficit (MBD) from the amount of streamed media data, wherein the MBD is based at least in part on an available bit rate of the streamed media data;
determining a value for a minimum block (MB) size used by a codec;
calculating a value for an amount of pre-data to be buffered that is summed from the MBD and the MB values; and
configuring the media player to initiate playback of the amount of streamed media data when the amount of streamed media data received and buffered by the media player is at least as large as the calculated value for the amount of pre-data to be buffered.

2. The method of claim 1, wherein the streamed media data corresponds to a streamed media clip.

3. The method of claim 1, further comprising recalculating the MBD in response to selecting a different portion of the streamed media data.

4. A media player configured to perform the steps of:
receiving and buffering an amount of streamed media data;
retrieving a value for a maximum bit deficit (MBD) from the amount of streamed media data, wherein the MBD is based at least in part on an available bit rate of the streamed media data;
determining a value for a minimum block (MB) size used by a codec;
calculating a value for an amount of pre-data to be buffered that is summed from the MBD and the MB values; and
initiating playback of the amount of streamed media data when the amount of streamed media data received and buffered by the media player is at least as large as the calculated value for the amount of pre-data to be buffered.

5. A system comprising:
a processor;
a non-transitory computer-readable medium storing computer-executable instructions comprising:
a module adapted to receive and buffer an amount of streamed media data;
a module adapted to retrieve a value for a maximum bit deficit (MBD) from the amount of streamed media data, wherein the MBD is based at least in part on an available bit rate of the streamed media data;
a module adapted to determine a value for a minimum block (MB) size used by a codec;
a module adapted to calculate a value for an amount of pre-data to be buffered that is summed from the MBD and MB values; and
a module adapted to initiate playback of the amount of streamed media data when the amount of streamed media data received and buffered by the system is at least as large as the calculated value for the amount of pre-data to be buffered.

6. The system of claim 5, wherein the media data corresponds to a media clip.

7. A method of configuring a media player, the method comprising:
receiving and buffering an amount of streamed media data;
retrieving values for a plurality of maximum bit deficits (MBDs) from the amount of streamed media data, wherein the MBDs are related to a plurality of projected available bit rates;
selecting a first MBD in response to an available bit rate of the streamed media data;
determining a value for a minimum block (MB) size used by a codec;
calculating a value for an amount of pre-data to be buffered that is summed from the selected MBD value and the MB value; and
configuring the media player to initiate playback of the amount of streamed media data when the amount of streamed media data received and buffered by the media player is at least as large as the calculated value for the amount of pre-data to be buffered.

8. The method of claim 7, wherein the streamed media data corresponds to a streamed media clip.

9. The method of claim 7, wherein selecting further comprising using the available bit rate to interpolate between at least two MBD values.

10. The method of claim 7, further comprising recalculating the MBD in response to selecting a different portion of the streamed media data.

11. A system comprising:
a processor;
a non-transitory computer-readable medium storing computer-executable instructions comprising:
a module adapted to receive and buffer an amount of streamed media data;
a module adapted to retrieve values for a plurality of maximum bit deficits (MBDs) from the amount of streamed media data, wherein the MBDs are related to a plurality of projected available bit rates;
a module adapted to select a first MBD from the plurality of MBDs in response to an available bit rate of the streamed media data;

a module adapted to determine a value for a minimum block (MB) size used by a codec;

a module adapted to calculate a value for an amount of pre-data to be buffered that is summed from the selected MBD value and the MB value; and a module adapted to initiate playback of the amount of streamed media data when the amount of streamed media data received and buffered by the system is at least as large as the calculated value for the amount of pre-data to be buffered.

12. The system of claim 11, wherein the streamed media data corresponds to a streamed media clip.

* * * * *